United States Patent
Wu et al.

(10) Patent No.: US 10,075,028 B2
(45) Date of Patent: Sep. 11, 2018

(54) DETERMINING PHYSICAL ALIGNMENT BETWEEN MAGNETIC COUPLERS FOR WIRELESS POWER TRANSFER

(71) Applicant: Utah State University, North Logan, UT (US)

(72) Inventors: Hunter H Wu, Salt Lake City, UT (US); Hadi Malek, Dearborn, MI (US); Michael P Masquelier, Park City, UT (US)

(73) Assignee: UTAH STATE UNIVERSITY, North Logan, UT (US)

( * ) Notice: Subject to any disclaimer, the term of this patent is extended or adjusted under 35 U.S.C. 154(b) by 362 days.

(21) Appl. No.: 14/559,817

(22) Filed: Dec. 3, 2014

(65) Prior Publication Data

US 2015/0155095 A1    Jun. 4, 2015

Related U.S. Application Data

(60) Provisional application No. 61/911,317, filed on Dec. 3, 2013.

(51) Int. Cl.
  *H02J 5/00* (2016.01)
  *H02J 7/02* (2016.01)
  (Continued)

(52) U.S. Cl.
  CPC ........... *H02J 50/90* (2016.02); *B60L 11/1829* (2013.01); *H02J 5/005* (2013.01); *H02J 7/025* (2013.01);
  (Continued)

(58) Field of Classification Search
  CPC .......................... B60L 11/182; B60L 11/1824; B60L 11/1827; B60L 11/1829; H01F 38/14;
  (Continued)

(56) References Cited

U.S. PATENT DOCUMENTS 8,169,185 B2    5/2012 Partovi et al.
2010/0117596 A1*  5/2010 Cook .................... B60L 11/182
                                                                320/108

(Continued)

FOREIGN PATENT DOCUMENTS

CN    101789636    7/2010
CN    101835653    9/2010
(Continued)

OTHER PUBLICATIONS

International Application No. PCT/US 2014/068460 filed Dec. 3, 2014, International Search Report and Written Opinion dated Mar. 26, 2015.

(Continued)

*Primary Examiner* — Levi Gannon
(74) *Attorney, Agent, or Firm* — Kunzler, PC.

(57) ABSTRACT

An apparatus includes an energy input module that applies an amount of energy to a primary converter of a wireless power transfer ("WPT") system. The WPT system includes secondary converter with a secondary receiver pad. The WPT system transfers energy from a primary transmitter pad to the secondary receiver pad and the secondary converter provides power to a load. The apparatus includes a coupling measurement module that measures a coupling coefficient between the primary transmitter pad and the secondary receiver pad when the primary transmitter pad and the secondary receiver pad are separated by a vertical distance and horizontally aligned at a horizontal position. The apparatus includes a coupling threshold module that determines if the coupling coefficient is above a coupling threshold, and an alignment alert module that sends an alignment alert in response to the coupling coefficient being above the coupling threshold.

57 Claims, 15 Drawing Sheets

(51) Int. Cl.
  *H02J 50/90* (2016.01)
  *H02J 17/00* (2006.01)
  *H02J 50/12* (2016.01)
  *B60L 11/18* (2006.01)

(52) U.S. Cl.
  CPC .............. *H02J 17/00* (2013.01); *H02J 50/12* (2016.02); *Y02T 90/122* (2013.01)

(58) Field of Classification Search
  CPC .......... H02J 5/005; H02J 7/0027; H02J 7/025; H02J 17/00; H02J 50/10; H02J 50/12; H02J 50/90; H04B 5/0037; Y02T 90/122
  USPC .......................... 307/9.1, 10.1, 104; 320/109
  See application file for complete search history.

(56) References Cited

U.S. PATENT DOCUMENTS

| | | | |
|---|---|---|---|
| 2010/0176659 A1* | 7/2010 | Aoyama | H02J 7/025 307/104 |
| 2010/0187912 A1 | 7/2010 | Kitamura et al. | |
| 2010/0225271 A1 | 9/2010 | Oyobe et al. | |
| 2010/0277121 A1 | 11/2010 | Hall et al. | |
| 2011/0181120 A1 | 7/2011 | Liu et al. | |
| 2011/0221387 A1* | 9/2011 | Steigerwald | B60L 11/182 320/108 |
| 2011/0254503 A1 | 10/2011 | Widmer et al. | |
| 2011/0285349 A1 | 11/2011 | Hanspeter | |
| 2012/0043172 A1 | 2/2012 | Ichikawa | |
| 2012/0112553 A1 | 5/2012 | Stoner, Jr. et al. | |
| 2012/0139358 A1* | 6/2012 | Teggatz | H01F 38/14 307/104 |
| 2012/0161696 A1* | 6/2012 | Cook | B60L 11/182 320/108 |
| 2012/0217818 A1* | 8/2012 | Yerazunis | H02J 5/005 307/104 |
| 2012/0235506 A1 | 9/2012 | Kallal et al. | |
| 2012/0235636 A1* | 9/2012 | Partovi | H02J 7/025 320/108 |
| 2012/0262002 A1 | 10/2012 | Widmer et al. | |
| 2013/0002034 A1 | 1/2013 | Kohei | |
| 2013/0024059 A1 | 1/2013 | Miller et al. | |
| 2013/0096651 A1* | 4/2013 | Ozawa | A61N 1/3787 607/61 |
| 2013/0188397 A1 | 7/2013 | Wu | |
| 2013/0249299 A1* | 9/2013 | Shijo | H02J 5/005 307/80 |
| 2013/0320759 A1* | 12/2013 | Abe | H01F 38/14 307/10.1 |
| 2014/0183967 A1* | 7/2014 | Ryu | B60L 11/182 307/104 |
| 2014/0203662 A1* | 7/2014 | Bae | H02J 17/00 307/104 |
| 2014/0217966 A1* | 8/2014 | Schneider | B60L 11/1829 320/108 |
| 2015/0155095 A1 | 4/2015 | Usu | |
| 2015/0280790 A1* | 10/2015 | Onizuka | H02J 17/00 320/108 |

FOREIGN PATENT DOCUMENTS

| | | |
|---|---|---|
| CN | 102089955 | 6/2011 |
| CN | 102421629 | 4/2012 |
| CN | 102947124 | 2/2013 |
| EP | 2833509 | 2/2015 |
| EP | 2985870 | 2/2016 |
| WO | 2011156768 A2 | 12/2011 |
| WO | 2012099965 | 7/2012 |
| WO | 2013003527 A1 | 1/2013 |
| WO | 2013011726 A1 | 1/2013 |
| WO | 2013056234 | 4/2013 |
| WO | 2015097995 | 2/2015 |

OTHER PUBLICATIONS

International Application No. PCT/US17/35066, filed May 30, 2017, International Search Report and Written Opinion, dated Aug. 31, 2017.

* cited by examiner

DETERMINING PHYSICAL ALIGNMENT BETWEEN MAGNETIC COUPLERS FOR WIRELESS POWER TRANSFER

CROSS-REFERENCES TO RELATED APPLICATIONS

This application claims the benefit of U.S. Provisional Patent Application No. 61/911,317 entitled "DETERMINING PHYSICAL ALIGNMENT BETWEEN MAGNETIC COUPLERS FOR WIRELESS POWER TRANSFER" and filed on Dec. 3, 2013 for Hunter Wu, et al., which is incorporated herein by reference.

FIELD

This invention relates to wireless power transfer and more particularly relates to determining alignment of wireless power transfer pads using a coupling coefficient.

BACKGROUND

Often wireless power transfer is affected by alignment of primary transmitter and a secondary receiver pads. Typically a higher amount of alignment will result in a higher wireless power transfer efficiency. Various methods of wireless power transfer are available, but typically require components and equipment in addition to the primary transmitter and secondary transfer pads used for wireless power transfer. In addition, many of the available methods for alignment have certain disadvantages in addition to increased cost.

SUMMARY

An apparatus for wireless power transfer alignment is disclosed. A system and method also perform the functions of the apparatus. The apparatus includes an energy input module that applies an amount of energy to a primary converter of a wireless power transfer ("WPT") system. The WPT system includes the primary converter with a primary transmitter pad and a secondary converter with a secondary receiver pad. The WPT system transfers energy from the primary transmitter pad of the primary converter to the secondary receiver pad of the secondary converter and the secondary converter provides power to a load. The apparatus includes a coupling measurement module that measures a coupling coefficient between the primary transmitter pad and the secondary receiver pad when the primary transmitter pad and the secondary receiver pad are separated by a vertical distance and horizontally aligned at a horizontal position. The apparatus includes a coupling threshold module that determines if the coupling coefficient is above a coupling threshold, and an alignment alert module that sends an alignment alert in response to the coupling coefficient being above the coupling threshold.

In one embodiment, the energy input module includes an energy increase module that applies the amount of energy to the primary converter by increasing an amount of energy applied to the primary converter over a specified amount of time. In another embodiment, the energy increase module increases an input voltage through an input voltage range. In another embodiment, the primary converter comprises an inverter and includes an H-bridge and the H-bridge is controlled using a phase angle duty cycle control technique. The energy increase module increases a conduction angle through a conduction angle range. In a further embodiment, the phase angle duty cycle control may include symmetric voltage-cancellation ("SVC") control, asymmetric voltage-cancellation ("AVC") control, or asymmetric duty cycle ("ADC") control.

In one embodiment, the energy input module applies the amount of energy to the primary converter during at least a quality factor number of switching cycles of a switching period of the primary converter. The quality factor includes a number of switching cycles for the WPT system to reach a steady state condition after a transient condition. In another embodiment, the primary converter operates with a switching frequency of about 23.4 kilohertz and the energy input module applies the amount of energy to the primary converter over about 1 millisecond. In another embodiment, the energy input module applies the amount of energy to the primary converter over a range of about 100 milliseconds to 1 second. In a related embodiment, the coupling coefficient is proportional to a ratio of output direct current ("DC") voltage to transmitter pad current. In another embodiment, the apparatus includes a voltage reset module that resets a voltage on an output capacitor of the secondary converter to an initial voltage before the energy input module applies the amount of energy to the primary converter, and/or after the energy input module applies the amount of energy to the primary converter. In another embodiment, the energy input module applies the amount of energy to the primary converter a plurality of times and the voltage reset module resets the output capacitor voltage after each time that the energy input module applies the amount of energy to the primary converter. The coupling measurement module determines an average coupling coefficient based on the measurements associated with each time that the amount of energy is applied to the primary converter.

In one embodiment, the energy input module applies the amount of energy to the primary converter under a no load condition between the secondary converter and the load, and the WPT system provides substantially no power to the load during the no load condition. In another embodiment, the energy input module includes a static input module that applies the amount of energy to the primary converter using a fixed rate of energy input. In a further embodiment, the static input module applies energy to the primary converter for a specified amount of time.

In one embodiment, the coupling measurement module measures bridge current and output voltage and determines a coupling coefficient based on the measured bridge current and/or output voltage. The output voltage is an output voltage of the secondary converter. In another embodiment, the coupling measurement module includes a coupling lookup module that determines a coupling coefficient from a coupling coefficient table, where the coupling coefficient table includes a plurality of coupling coefficients and each coupling coefficient in the coupling coefficient table includes a corresponding output voltage and/or a corresponding bridge current.

In another embodiment, the coupling measurement module includes a coupling calculation module that determines a coupling coefficient using a coupling coefficient formula where the output voltage and/or bridge current are variables and coupling coefficient is an output of the coupling coefficient formula. In another embodiment, the primary converter and secondary converter comprise an LCL resonant inverter system and the coupling coefficient formula is:

$$i_b = \frac{L_b L_m M R_2 V_1 s^2}{C_1 \beta \left( V_1 - \frac{L_m V_1 \sigma_3}{C_1 n^2 \left( L_b s + \frac{L_m \sigma_3}{C_1 n^2 \sigma_1 \sigma_2} \right) \sigma_1 \sigma_2} \right)}$$

$$\sigma_1 \left( R_2 + L_2 s + \frac{1}{C_2 s} \right) \sigma_2$$

where:

$$\beta = L_b s + \frac{L_m \sigma_3}{C_1 n^2 \sigma_1 \sigma_2}$$

$$\sigma_1 = L_m s + \frac{\sigma_3}{C_1 n^2 s \sigma_2}$$

$$\sigma_2 = L_1 s + \frac{1}{C_1 s} + \frac{1}{C_{1s} s} - \frac{M^2 s^2}{R_2 + L_2 s + \frac{1}{C_2 s}}$$

$$\sigma_3 = L_1 s + \frac{1}{C_{1s} s} - \frac{M^2 s^2}{R_2 + L_2 s + \frac{1}{C_2 s}}$$

$$k = \frac{M}{\sqrt{L_1 \cdot L_2}}$$

and:
k coupling coefficient;
M Mutual inductance between primary transmitter pad and the secondary receiver pad;
$L_1$ Self-inductance of the primary transmitter pad;
$L_2$ Self-inductance of the secondary receiver pad;
$i_b$ Inductor current of inductor $L_b$;
$L_m$ Transformer magnetizing inductance;
$C_2$ Parallel tuning capacitor on a secondary resonant circuit of the secondary converter;
$C_{1s}$ Series tuning capacitor on a primary LCL load resonant converter of the primary converter;
$C_1$ Parallel tuning capacitor on the primary LCL load resonant converter;
$L_b$ Bridge inductance of LCL load resonant converter;
$R_2$ Initial output voltage divided by output current;
$V_1$ DC input voltage to the primary LCL load resonant converter;
s i·ω where i is an imaginary number
ω Angular operating frequency of primary converter in radians where ω=2πf
f Operating frequency of the primary converter in hertz; and
n Turns ratio of a transformer in the primary converter.

In one embodiment, the apparatus includes a misalignment alert module that sends a misalignment alert in response to the coupling coefficient being below the coupling threshold. In another embodiment, the primary converter includes an LCL load resonant converter and the LCL load resonant converter includes an H-bridge, an LCL network, and a primary transmitter pad, and the secondary converter includes an LCL network and a rectification section. The rectification section includes an output capacitor and the rectification section is connected to a load. In another embodiment, the coupling threshold is a minimum coupling threshold. In the embodiment, the apparatus includes a maximum threshold module that determines if the coupling coefficient is above a maximum coupling threshold, and a maximum signal module that sends a maximum threshold alert in response to the maximum threshold module determining that the coupling coefficient is above the maximum coupling threshold. In another embodiment, the secondary converter transfers energy to the load in response to receiving the alignment alert from the alignment alert module.

In one embodiment, the primary converter and the secondary converter are bidirectional and the energy input module applies an amount of energy to the secondary converter and the secondary converter transfers energy from the secondary receiver pad to the primary transmitter pad of the primary converter and the primary converter provides power to a load during a measurement operation, and the primary converter transfers energy from the primary transmitter pad to the secondary receiver pad of the secondary converter and the secondary converter provides power to the load during a load power operation. In another embodiment, the apparatus includes a shutdown threshold module that determines if the coupling coefficient is below a coupling shutdown threshold, and a charging shutdown module that stops the primary converter from providing power in response to the coupling coefficient being below the coupling shutdown threshold.

A wireless power transfer ("WPT") system includes a primary converter with a primary transmitter pad, a secondary converter with a secondary receiver pad, and a load coupled to the secondary receiver. The primary converter transmits energy wirelessly from the primary transmitter pad to the secondary receiver pad and the secondary converter sends the received energy to the load. The system, in one embodiment, includes an energy input module that applies an amount of energy to the primary converter and a coupling measurement module that measures a coupling coefficient between the primary transmitter pad and the secondary receiver pad when the primary transmitter pad and the secondary receiver pad are separated by a vertical distance and horizontally aligned at a horizontal position. The system includes, in one embodiment, a coupling threshold module that determines if the coupling coefficient is above a coupling threshold, and an alignment alert module that sends an alignment alert in response to the coupling coefficient being above the coupling threshold. In one embodiment, the primary converter is stationary and the secondary converter is on a vehicle, and the secondary receiver pad is located to align with the stationary primary transmitter pad.

A method for alignment for a wireless power transfer system includes applying an amount of energy to a primary converter of the WPT system. The WPT system includes the primary converter with a primary transmitter pad and a secondary converter with a secondary receiver pad. The WPT system transfers energy from the primary transmitter pad of the primary converter to the secondary receiver pad of the secondary converter, and the secondary converter provides power to a load. The method includes measuring a coupling coefficient between the primary transmitter pad and the secondary receiver pad when the primary transmitter pad and the secondary receiver pad are separated by a vertical distance and horizontally aligned at a horizontal position. The method includes determining if the coupling coefficient is above a coupling threshold, and sending an alignment alert in response to the coupling coefficient being above the coupling threshold.

An apparatus for alignment with multiple sets of receiver pads includes a coupling measurement module that measures, for each set of receiver pads, a coupling coefficient. A set of receiver pads includes a primary transmitter pad mounted in a fixed location and a secondary receiver pad mounted on a movable object. The primary transmitter pad of a set of receiver pads transmits power wirelessly to the secondary receiver pad of the set of receiver pads, and the movable object includes two or more secondary receiver pads, each corresponding to a primary transmitter pad mounted in a fixed location. The apparatus, in one embodiment, includes a coupling comparison module that compares, for each set of receiver pads, the measured coupling coefficient with one or more pre-determined coupling coefficients to determine an alignment of each set of receiver pads. The predetermined coupling coefficients correspond to various alignment conditions of a set of receiver pads. The apparatus includes an alignment module that determines an alignment of the movable object based on the determined alignments of the sets of receiver pads.

In one embodiment, the two or more secondary receiver pads and corresponding primary transmitter pads include a first set of receiver pads and a second set of receiver pads and a first set of primary transmitter and secondary receiver pads, and a second set of primary transmitter and secondary receiver pad are aligned in line with a direction of travel of the movable object or perpendicular to a direction of travel of the movable object. In another embodiment, the two or more secondary receiver pads and corresponding primary transmitter pads include three or more sets of primary transmitter and secondary receiver pads, and the sets of primary transmitter and secondary receiver pads are mounted in a pattern to provide alignment information in a direction of travel of the movable object and perpendicular to the direction of travel of the movable object.

In one embodiment, the apparatus includes four or more sets of primary transmitter and secondary receiver pads and the secondary receiver pads and corresponding primary transmitter pads are arranged in a square pattern relative to the direction of travel of the movable object, a rectangular pattern relative to the direction of travel of the movable object, a diamond pattern relative to the direction of travel of the movable object, and a pattern with a secondary receiver pad near a front of the movable object, a secondary receiver pad near a rear of the movable object, and a pair of secondary receiver pads arranged next to each other on a line perpendicular to the direction of travel of the moveable object and between the front and rear secondary receiver pads.

In one embodiment, one or more of the sets of receiver pads are part of a WPT system that wirelessly transfers energy from one or more of the primary transmitter pads to corresponding secondary receiver pads. In another embodiment, the WPT system transfers power to a load of the movable object through one or more of the sets of receiver pads. In another embodiment, the apparatus includes an alignment communication module that communicates alignment of the movable object to a user, a computer system, and/or a driver when the movable object comprises a vehicle.

In another embodiment, the alignment communication module communicates alignment of the movable object by a graphical representation of the movable object and an amount of alignment or misalignment, an amount of alignment or misalignment of each set of receiver pads, text indicating alignment or misalignment, an audio signal indicating alignment or misalignment, and a direction of misalignment. In another embodiment, each primary transmitter pad and corresponding secondary receiver pad is paired using a unique identifier and the coupling measurement module measures a coupling coefficient of a set of receiver pads without measuring a coupling coefficient of a primary transmitter pad of a first set and a secondary receiver pad of a second set. In another embodiment, a set of receiver pads includes two or more secondary receiver pads paired with a single primary transmitter pad and the alignment module determines a direction of misalignment based on the coupling measurement module measuring a coupling coefficient for each secondary receiver pad and the primary transmitter pad and the coupling comparison module comparing each measured coupling coefficient with a predetermined coupling coefficient.

A method for alignment for a WPT system includes measuring, for each set of receiver pads, a coupling coefficient. A set of receiver pads includes a primary transmitter pad mounted in a fixed location and a secondary receiver pad mounted on a movable object. The primary transmitter pad of a set of receiver pads transmits power wirelessly to the secondary receiver pad of the set of receiver pads, and the movable object includes two or more secondary receiver pads, each corresponding to a primary transmitter pad mounted in a fixed location. The method includes comparing, for each set of receiver pads, the measured coupling coefficient with one or more pre-determined coupling coefficients to determine an alignment of each set of receiver pads. The predetermined coupling coefficients correspond to various alignment conditions of a set of receiver pads. The method includes determining an alignment of the movable object based on the determined alignments of the sets of receiver pads.

An apparatus for determining alignment includes an energy input module that applies an amount of energy to a first primary transmitter pad and to a second primary transmitter pad of a WPT system. The WPT system includes the first primary transmitter pad, the second primary transmitter pad, a first secondary receiver pad and a second secondary receiver pad. The WPT system transfers energy from the first primary transmitter pad to the first secondary receiver pad and from the second primary transmitter pad to the second secondary receiver pad, and the first secondary receiver pad provides power for a load and the second secondary receiver pad provides power for a load. The apparatus includes a first coupling measurement module that measures a first coupling coefficient between the first primary transmitter pad and the first secondary receiver pad when the first primary transmitter pad and the first secondary receiver pad are separated by a vertical distance and horizontally aligned at a horizontal position. The apparatus includes a second coupling measurement module that measures a second coupling coefficient between the second primary transmitter pad and the second secondary receiver pad when the second primary transmitter pad and the second secondary receiver pad are separated by a vertical distance and horizontally aligned at a horizontal position. The apparatus includes an alignment module that determines alignment between the first and second primary transmitter pads relative to the first and second secondary receiver pads based on the first coupling coefficient and the second coupling coefficient.

In one embodiment, the second primary transmitter pad is shaped with coils around an interior section and the first primary transmitter pad is positioned within the interior section of the second primary transmitter pad and the second secondary receiver pad is shaped with coils around an interior section and the first secondary receiver pad is positioned within the interior section of the second secondary receiver pad. In another embodiment, the first primary transmitter pad is at a center of the interior section of the second secondary receiver pad and the first secondary receiver pad is at a center of the interior section of the second secondary receiver pad. In another embodiment, the first primary transmitter pad and the first secondary receiver pad are sized to transmit an energy level consistent with an alignment operation and the second primary transmitter pad and the second secondary receiver pad are sized to transmit an energy level consistent with an alignment operation and a charging operation.

In one embodiment, the alignment module determines alignment by inputting the first and second coupling coefficients in an algorithm to calculate an alignment condition where an alignment condition is related to a combination of the first coupling coefficient and the second coupling coefficient. In another embodiment, the alignment module determines alignment using an alignment lookup table. The alignment lookup table includes a plurality of alignment conditions where each alignment condition corresponds to a combination of a first coupling coefficient and a second coupling coefficient. In another embodiment, the alignment module determines alignment using the alignment lookup table and interpolation between values in the alignment lookup table to determine an alignment condition.

In one embodiment, the alignment module determines alignment by determining a first pad alignment condition of the first primary transmitter pad and the first secondary receiver pad and by determining a second pad alignment condition of the second primary transmitter pad and the second secondary receiver pad. In a further embodiment, the alignment includes a coupling threshold module that determines if the first coupling coefficient is above a first coupling threshold and that determines if the second coupling coefficient is above a second coupling threshold, and an alignment alert module that sends a first alignment alert in response to the first coupling coefficient being above the first coupling threshold and sends a second alignment alert in response to the second coupling coefficient being above the second coupling threshold. In another embodiment, the coupling threshold module compares the first coupling coefficient to a plurality of first coupling thresholds and compares the second coupling coefficient to a plurality of second coupling thresholds and the alignment alert module sends a different alignment alert for each condition of the first coupling coefficient exceeding a first coupling threshold of a plurality of first thresholds and the second coupling coefficient exceeding a second coupling threshold of a plurality of second thresholds.

In one embodiment, the WPT system includes a primary inverter that that receives input power and converts the input power to a waveform with an AC waveform and selectively transfers power to the first primary transmitter pad and the second primary transmitter pad, and a secondary converter that receives power from the first secondary receiver pad and/or the second secondary receiver pad and converts power to a form usable for providing power to a load. In another embodiment, the WPT system includes a first primary inverter that that receives input power and converts the input power to a waveform with an AC waveform and transfers power to the first primary transmitter pad, a first secondary converter that receives power from the first secondary receiver pad and converts power from the first secondary receiver pad to a form usable for providing power to a load, a second primary inverter that that receives input power and converts the input power to a waveform with an AC waveform and transfers power to the second primary transmitter pad, and a second secondary converter that receives power from the second secondary receiver pad and converts power from the second secondary receiver pad to a form usable for providing power to a load.

A method for alignment includes applying an amount of energy to a first primary transmitter pad and a second primary transmitter pad of a WPT system. The WPT system includes the first primary transmitter pad, the second primary transmitter pad, a first secondary receiver pad and a second secondary receiver pad. The WPT system transfers energy from the first primary transmitter pad to the first secondary receiver pad and from the second primary transmitter pad to the second secondary receiver pad. The first secondary receiver pad provides power for a load and the second secondary receiver pad provides power for a load. The method includes measuring a first coupling coefficient between the first primary transmitter pad and the first secondary receiver pad when the first primary transmitter pad and the first secondary receiver pad are separated by a vertical distance and horizontally aligned at a horizontal position. The method includes measuring a second coupling coefficient between the second primary transmitter pad and the second secondary receiver pad when the second primary transmitter pad and the second secondary receiver pad are separated by a vertical distance and horizontally aligned at a horizontal position. The method includes determining alignment between the first and second primary transmitter pads relative to the first and second secondary receiver pads based on the first coupling coefficient and the second coupling coefficient.

In one embodiment, determining alignment includes inputting the first and second coupling coefficients in an algorithm to calculate an alignment condition wherein an alignment condition is related to a combination of the first coupling coefficient and the second coupling coefficient. In another embodiment, determining alignment includes using an alignment lookup table. The alignment lookup table includes a plurality of alignment conditions where each alignment condition corresponds to a combination of a first coupling coefficient and a second coupling coefficient.

In another embodiment, determining alignment includes determining a first pad alignment condition of the first primary transmitter pad and the first secondary receiver pad and by determining a second pad alignment condition of the second primary transmitter pad and the second secondary receiver pad. In another embodiment, determining alignment includes determining if the first coupling coefficient is above a first coupling threshold and determining if the second coupling coefficient is above a second coupling threshold, and sending a first alignment alert in response to the first coupling coefficient being above the first coupling threshold and sending a second alignment alert in response to the second coupling coefficient being above the second coupling threshold.

A WPT system includes a first primary transmitter pad, a first secondary receiver pad, a second primary transmitter pad, a second secondary receiver pad, where the WPT system transfers energy from the first primary transmitter pad to the first secondary receiver pad and from the second primary transmitter pad to the second secondary receiver pad. The WPT system includes a load coupled to the secondary receiver pad, where energy from the second secondary receiver pad provides power to the load. The WPT system includes an energy input module that applies an amount of energy to the first primary transmitter pad and to the second primary transmitter pad. The WPT system includes a first coupling measurement module that measures a first coupling coefficient between the first primary transmitter pad and the first secondary receiver pad when the first primary transmitter pad and the first secondary receiver pad are separated by a vertical distance and horizontally aligned at a horizontal position, and a second coupling measurement module that measures a second coupling coefficient between the second primary transmitter pad and the second secondary receiver pad when the second primary transmitter pad and the second secondary receiver pad are separated by a vertical distance and horizontally aligned at a horizontal position. The WPT system includes an alignment module that determines alignment between the first and second primary transmitter pads relative to the first and second secondary receiver pads based on the first coupling coefficient and the second coupling coefficient.

In one embodiment, the system includes a vehicle where the first secondary receiver pad and the second secondary receiver pad are mounted to the vehicle and the load includes a battery that provides power to the vehicle and/or a drive system that moves the vehicle. In another embodiment, the system includes a first primary inverter that that receives input power from the input module and converts the input power to a waveform with an AC waveform and selectively transfers power to one or more of the first primary transmitter pad and the second primary transmitter pad, and/or a first secondary converter that receives power from one or more of the first secondary receiver pad and the second secondary receiver pad and converts power to a form usable for providing power to a load. The WPT system may include a second primary inverter that that receives input power and converts the input power to a waveform comprising an AC waveform and transfers power to the second primary transmitter pad and/or a second secondary converter that receives power from the second secondary receiver pad and converts power from the second secondary receiver pad to a form usable for providing power to the load. The WPT system may include a battery that receives power from one or more of the first secondary converter and the second secondary converter, the battery comprising at least a portion of the load, and/or a motor that receives power from the first secondary converter and/or the second secondary converter, where the motor is at least a portion of the load.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
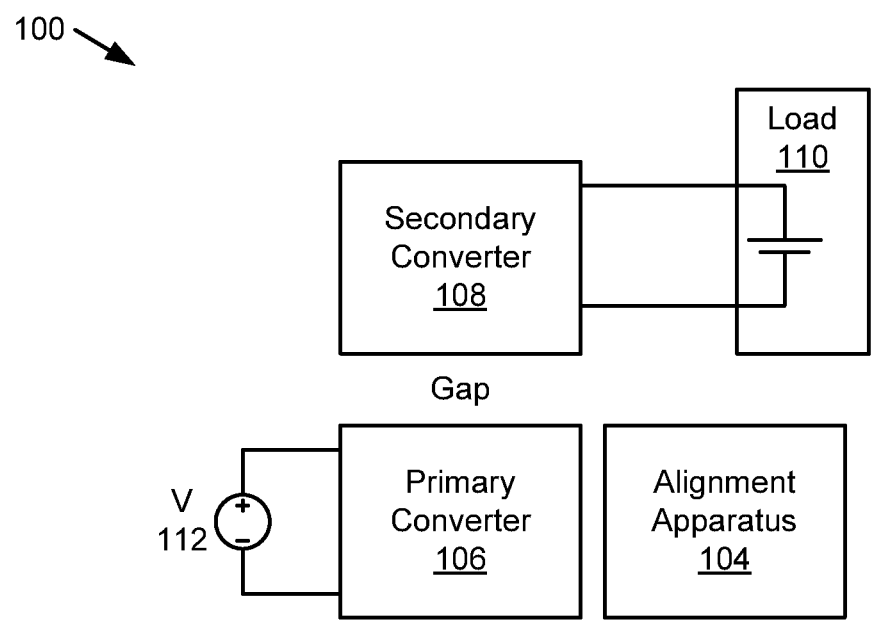
FIG. 1A is a schematic block diagram illustrating one embodiment of a system for alignment for wireless power transfer in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1A is a schematic block diagram illustrating one embodiment of a system 100 for alignment for wireless power transfer in accordance with one embodiment of the present invention. The system 100 includes an alignment apparatus 104, a primary converter 106, a secondary converter 108, a load 110, and a power source 112, which are described below.

The system 100 includes an alignment apparatus 104 for determining alignment of receiver pads of a wireless power transfer ("WPT") system. The alignment apparatus 104, in one embodiment, is included with the primary converter 106 and may communicate with a vehicle or other movable object where the secondary converter 108 resides. In another embodiment, a portion of the alignment apparatus 104 is located with the primary converter 106 and a portion of the alignment apparatus 104 resides with a vehicle or other movable object where the secondary converter 108 resides. The alignment apparatus 104 provides a way to determine alignment of a primary transmitter pad that is part of the primary converter 106 and a secondary receiver pad that is part of the secondary converter 108. The alignment apparatus 104 is described in more detail in relation to the apparatuses 200, 300 of FIGS. 2 and 3.

In one embodiment, the system 100 includes a primary converter 106 that receives energy from the power source 112 and transfers energy wirelessly across a gap from a primary transmitter pad that is part of the primary converter 106 to a secondary receiver pad that is part of the secondary converter 108. In one embodiment the primary converter 106 is an inverter that converts electrical energy to a waveform that includes one or more alternating current ("AC") waveforms.

As used herein, the primary converter 106 may be used interchangeably with the term "primary inverter" when referring to a device that converts electrical energy to a waveform that includes one or more AC waveforms. Likewise, the secondary converter 108 may include an inverter. For example, the WPT system 100 may be bidirectional where the secondary converter 108 may receive power and convert the power to a waveform with one or more AC waveforms and may transmit power to the primary converter 106, which may transmit power to a load.

In one embodiment, the primary transmitter pad is mounted in a fixed location and the primary converter 106 is typically located near the primary transmitter pad. The system 100 includes a secondary converter 108 with the secondary receiver pad. The secondary converter 108 provides power to a load 110. The secondary converter 108 and load 110, in one embodiment, may be included in a vehicle or other movable object. The movable object may be any device that receives power wirelessly, such as a mobile communication device, a mobile computing device, etc.

In one embodiment, the primary converter 106 converts energy from the power source 112 to an alternating current ("AC") waveform with one or more sinusoidal frequencies. The AC waveform is transferred to the primary transmitter pad which transfers energy across a gap to the secondary receiver pad using magnetic coupling. The secondary converter 108, in one embodiment, generates and AC waveform from the magnetic energy transferred across the gap to the secondary receiver pad. In one embodiment, the secondary converter 108 converts the AC waveform to a direct current ("DC") waveform for providing DC power to the load 110. In another embodiment, the secondary converter 108 provides AC power to the load 110.

In one embodiment, the secondary converter 108 and associated secondary receiver pad and load 110 are on a vehicle and the alignment apparatus 104 provides alignment information as the vehicle moves over the primary transmitter pad. The alignment information may allow the vehicle to align the primary transmitter and secondary receiver pads to increase efficiency of wireless power transfer between the receiver pads. The load 110, in one embodiment, is a battery and the vehicle is an electric vehicle powered by the battery. The primary transmitter pad may be located in a driving surface and the vehicle may move over the primary transmitter pad to charge the battery as a load 110 before moving to another primary transmitter pad for further charging.

The power source 112, in one embodiment, is a DC power source and the primary converter 106 converts the DC power from the power source 112 to AC power for wireless power transfer. In another embodiment, the power source 112 is an AC power source, such as from an electric utility, generator, fuel cell, turbine, etc. and the primary converter 106 uses the AC power for wireless power transfer. In one embodiment, the primary converter 106 includes a rectifier section to convert the AC power to DC power. The rectifier section may include a passive rectifier section, for example with diodes and filters. The rectifier section may include an active rectifier section, for example that provides active power factor correction.

Figure 1B:
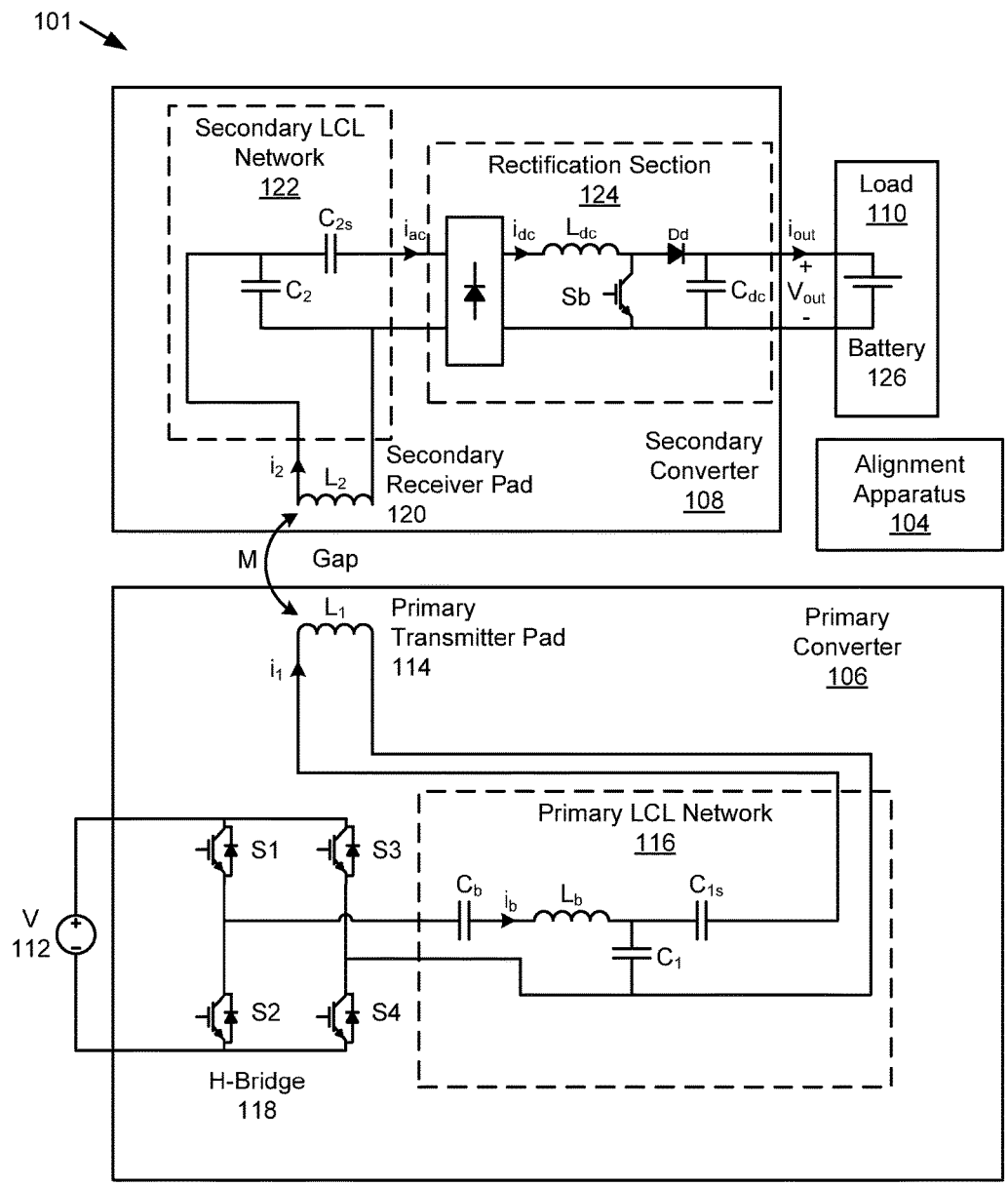
FIG. 1B is a schematic block diagram illustrating a second embodiment of a system for alignment for wireless power transfer in accordance with one embodiment of the present invention.

FIG. 1B is a schematic block diagram illustrating a second embodiment of a system 101 for alignment for wireless power transfer in accordance with one embodiment of the present invention. The system 101 includes an embodiment of an alignment apparatus 104, a primary converter 106 with a primary transmitter pad 114, a primary LCL network 116, and an H-bridge 118, a secondary converter 108 with a secondary receiver pad 120, a secondary LCL network 122, and a rectification section 124, a load 110 with a battery 126, and a power source 112, which are described below. Discussion above in relation to the system 100 of FIG. 1 with regard to an alignment apparatus 104, a primary converter 106, a secondary converter 108, a load 110, and a power source 112 are applicable for the system 101 of FIG. 1B.

In one embodiment, the primary converter 106 includes an H-bridge 118 and a primary LCL network 116 connected to a primary transmitter pad 114. In the embodiment, the primary converter 106 is an LCL resonant inverter known in art. The H-bridge 118 is shown with four switches S1-S4. The switches S1-S4 are typical semiconductor switches and may be insulated-gate bipolar transistor ("IGBT") switches, metal-oxide-semiconductor field-effect transistors ("MOSFET"), bipolar-junction transistors ("BJT"), or other type of switch. In one embodiment, the switches are mechanical switches.

The H-bridge 118 allows a power source to be connected to a load in either polarity. For example, when switches S1 and S4 are closed while switches S2 and S3 are open, the H-bridge 118 connects the power source 112 or DC voltage to the primary LCL network 116 with a first polarity and when switches S2 and S3 are closed while switches 51 and S4 are open, the H-bridge 118 connects the power source 112 or DC voltage to the primary LCL network 116 with a second polarity.

Typically, for an LCL resonant inverter and other primary converters 106, the power source is a DC power source. In one embodiment, the power source 112 is a DC power source connected directly to the H-bridge 118. In another embodiment, the power source 112 is an AC power source and the primary converter 106 includes a rectification section that converts the AC power from the power source 112 to a DC power. In the depicted LCL resonant inverter, the primary LCL network 116 is connected to the H-bridge 118 as a load. The depicted primary LCL network 116 is one possible LCL architecture and includes capacitor $C_b$, bridge inductor $L_b$ with bridge current $i_b$, capacitor $C_1$ and capacitor $C_{1s}$. One of skill in the art will recognize other primary LCL network 116 architectures that may be used in an LCL resonant inverter.

The primary transmitter pad 114 includes inductance $L_1$ and has current $i_1$ flowing through the inductor $L_1$. The primary transmitter pad 114 receives an AC waveform from the primary LCL network 116 and includes magnetic components that generate an electromagnetic waveform that couples to the secondary receiver pad 120, which also has an inductance $L_2$. Magnetic coupling between the primary transmitter pad 114 and the secondary receiver pad 120 cause a wireless energy transfer from the primary transmitter pad 114 to the secondary receiver pad 120 so that an AC current $i_2$ flows through the secondary receiver pad 120 inductance $L_2$. The primary transmitter pad 114 and the secondary receiver pad 120 share a mutual inductance M. The primary transmitter pad 114 and secondary receiver pad 120, in one embodiment, are substantially similar to the receiver pads described in U.S. patent application Ser. No. 13/748,269, for Hunter Wu, titled "Wireless Power Transfer System," filed Jan. 23, 2013, which is herein incorporated by reference for all purposes.

The inductor current $i_2$ of the secondary receiver pad 120 flows to a secondary LCL network 122 of the secondary converter 108. The secondary LCL network 122 includes a capacitor C2 and a capacitor C2s. Typically the primary LCL network 116 and secondary LCL network 122 along with the inductances L1, L2 of the primary transmitter pad 114 and secondary receiver pad 120 are designed around a resonant frequency. Often the resonant frequency is related to a switching frequency of the H-bridge 118. In one embodiment, the switching frequency of the H-bridge may be in a range of about 10 kilo hertz ("kHz") to 100 kHz. In one embodiment, the switching frequency of the H-bridge 118 is about 23 kHz. LCL resonant inverters have been found to be an efficient way to wirelessly transfer energy across a gap from a primary transmitter pad to a secondary receiver pad in a WPT system.

The secondary converter 108 also includes a rectification section 124. The depicted rectification section 124 includes a rectification circuit, depicted as a box with a rectifier, followed by a DC-to-DC converter that includes and inductor $L_{dc}$, switch $S_b$, diode $D_d$, and capacitor $C_{dc}$. The rectification circuit may include one or more diodes, such as a half-bridge or full-bridge rectifier and may include a filter section with inductors, capacitors, etc. One of skill in the art will recognize ways to rectify an AC waveform to create a DC voltage as input to a DC-to-DC converter. The depicted DC-to-DC converter is a simple buck converter, but may be any DC-to-DC converter topology, such as a buck-derived converter, a boost-derived converter, a buck-boost converter, a Ćuk converter, etc. A typical DC-to-DC converter includes some type of feedback to control an output voltage $V_{out}$ or output current $i_{out}$. The DC-to-DC converter may be used to control power to the load 110, such as charging of a battery 126.

Magnetic coupling between the primary transmitter pad 114 and secondary receiver pad 120 is highly dependent on the size of the gap, what is in the gap, and alignment of the primary transmitter pad and secondary receiver pad 120. Where the secondary receiver pad 120 is on a movable object, such as a vehicle, the primary transmitter pad 114 may be mounted in a fixed position in the ground or attached to the ground and the vehicle may approach the primary transmitter pad 114 for charging. Typically the primary transmitter pad 114 includes a top surface that is placed in a horizontal plane and the secondary receiver pad 120 includes a bottom surface that is parallel to the top surface of the primary transmitter pad 114. The size of the gap in this case may be a vertical clearance between the primary transmitter pad 114 and the secondary receiver pad 120, which may be mounted to a bottom of the vehicle. The gap may be primarily air, but may also include a portion of the driving surface, such as asphalt, concrete, dirt, etc. and may also include some type of covering of the primary transmitter 114 and secondary receiver pad 120. For example, the secondary receiver pad 120 may have a covering to hold the secondary receiver pad 120 in place or to protect the secondary receiver pad 120 from road hazards.

Alignment of the primary transmitter pad 114 and secondary receiver pad 120 will also depend on how the vehicle approaches the primary transmitter pad 114 and where the vehicle stops. Typically a higher amount of alignment leads to a higher charging efficiency with a more efficient wireless energy transfer across the gap. Gap size, material in the gap, and alignment typically affect a coupling coefficient of the primary transmitter pad 114 and secondary receiver pad 120. Coupling coefficients will be discussed in more detail in relation to the apparatuses 200, 300 of FIGS. 2 and 3.

Figure 1C:
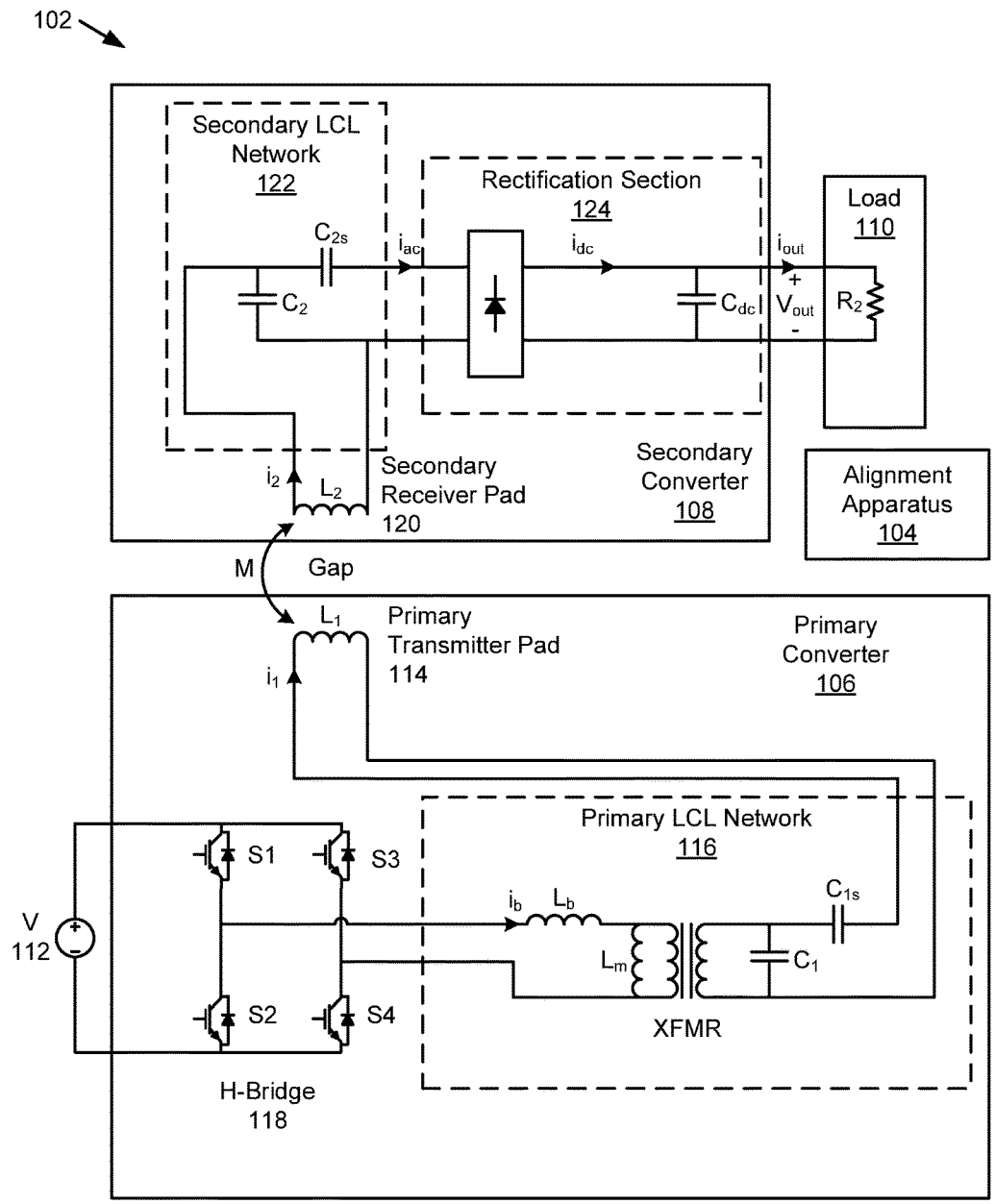
FIG. 1C is a schematic block diagram illustrating a third embodiment of a system for alignment for wireless power transfer in accordance with one embodiment of the present invention.

FIG. 1C is a schematic block diagram illustrating a third embodiment of a system 102 for alignment for wireless power transfer in accordance with one embodiment of the present invention. The system 102 includes an embodiment of an alignment apparatus 104, a primary converter 106 with a primary transmitter pad 114, a primary LCL network 116, and an H-bridge 118, a secondary converter 108 with a secondary receiver pad 120, a secondary LCL network 122, and a rectification section 124, a load 110, and a power source 112, which are substantially similar to those described above in relation to the system 101 of FIG. 1B except that the primary LCL network 116 has a different topology, the rectification section 124 does not include a DC-to-DC converter, and the load 110 is a resister $R_2$.

The system 102, in one embodiment, includes a load 110 that is a resistor $R_2$ and a rectification section 124 without a DC-to-DC converter for modeling purposes. For example, where the system 102 is a model, the model may represent the system 101 of FIG. 1B for conditions where the load does not have transient load changes. The resistor $R_2$ may represent a steady-state load condition that represents an output voltage $V_{out}$ divided by an output current $i_{out}$. Under steady-state conditions, the feedback loop of the DC-to-DC converter need not be modeled and the DC-to-DC converter function may be modeled as merely a voltage change. The voltage change may be represented by a transformer XFMR in the primary LCL network 116. The primary LCL network 116 also does not include capacitor $C_b$, which may or may not be included, depending on the topology chosen for the LCL resonant inverter and for modeling purposes. Modeling results will be discussed in more detail below.

In another embodiment, the load 110 may include an actual resistive load and resistor $R_2$ may represent the resistive load. In the embodiment, the load 110 may not require tight voltage regulation and the DC-to-DC converter may be omitted where the output voltage $V_{out}$ may vary.

Coupling coefficient between the primary transmitter pad 114 and secondary receiver pad 120, in one embodiment, may be used to determine alignment of the primary transmitter pad 114 and secondary receiver pad 120. For example, where the secondary receiver pad 120 is located on a vehicle, the secondary receiver pad 120 may be located a fixed distance or near fixed distance from the ground. The distance from the secondary receiver pad 120 to the ground may vary slightly due to variations in tire pressure, terrain changes, etc., however the variation may be small and may not be a significant factor in determining a coupling coefficient.

The primary transmitter pad 114 may be mounted flush with the ground or slightly above or below the ground. Since the primary transmitter pad 114 has a fixed mounting and the vehicle supports the secondary receiver pad 120 at nearly a fixed amount above the primary transmitter pad 114, alignment and material in the gap may be relevant variables in determining a coupling coefficient. The material in the gap typically is air plus any covering of the primary transmitter pad 114 and secondary receiver pad 120, such as asphalt. Snow, ice, debris, etc. may also be within the gap, but may not affect the coupling coefficient dramatically or may be accounted for by adjustments in equations for calculating coupling coefficient or adjustments to known coupling coefficient values.

In one embodiment, the coupling coefficient may be determined by measuring bridge current $i_b$ or output voltage $V_{out}$ or both. Some existing alignment systems may require transfer of data across the gap on a real-time basis. For example, measurement of system variables may require data transfer speeds that require expensive data transfer techniques. Other alignment systems may use method, such as sensors, that may be affected by weather, obstructions, and other problems and require equipment in addition to a WPT system. Calculating a coupling coefficient using bridge current $i_b$ and/or output voltage $V_{out}$ overcomes many of the problems of the prior art. For example, bridge current $i_b$ can be measured in the primary converter 106 without real-time communication across the gap.

In one embodiment, coupling coefficients are correlated to an amount of misalignment. For example, when the primary transmitter pad 114 and secondary receiver pad 120 are aligned with a particular vertical distance, the coupling coefficient may be at a maximum value. As the primary transmitter pad 114 and secondary receiver pad 120 are misaligned, the coupling coefficient may decrease. A particular coupling coefficient may represent a particular amount of alignment or misalignment. For example, a particular coupling coefficient may be measured for alignment, a second, lower coupling coefficient may be measured for one inch of misalignment, a third, even lower coupling coefficient may be measured for two inches of misalignment. The coupling coefficients may be affected by vertical height, initial output voltage $V_{out}$, material in the gap, etc. Where the vertical height is known, i.e. a vehicle has a particular height from the ground, and where material in the gap is known, i.e. is primarily air but may include a particular amount of asphalt, etc. The measured coupling coefficient may be compared to other coupling coefficients for a same vertical height, material in the gap, a same initial output voltage $V_{out}$, etc. to determine an amount of misalignment.

Once a coupling coefficient is determined, the information may be transferred to the vehicle using a communication method that is less expensive than real-time communication. If output voltage $V_{out}$ is used to determine the coupling coefficient, the output voltage $V_{out}$ is measured on the vehicle and need not be transferred across the gap. Once a bridge current $i_b$ and/or output voltage is measured, the information may be used to determine alignment. Embodiments of the alignment apparatus 102 for determining alignment of the primary transmitter pad 114 and secondary receiver pad 120 are described below.

Figure 2:
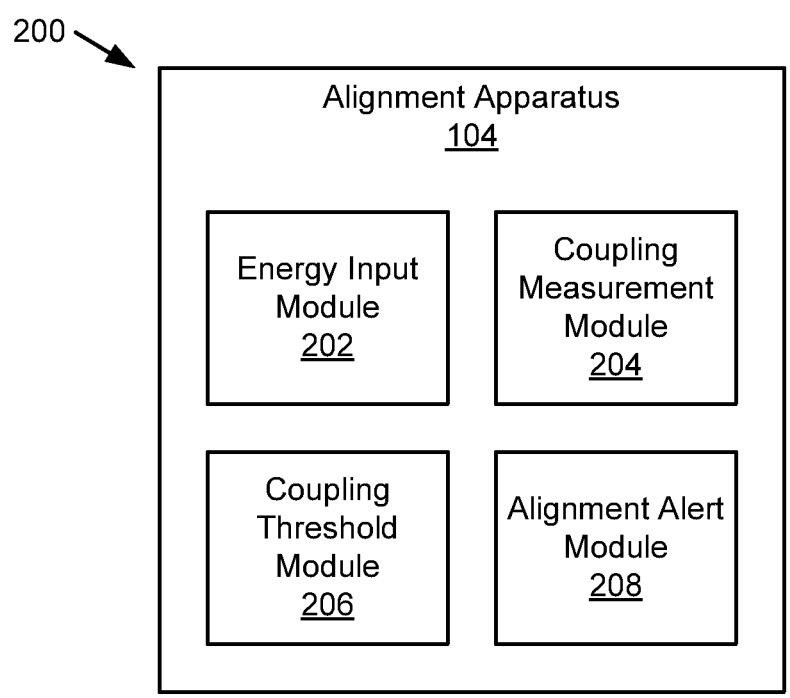
FIG. 2 is a schematic block diagram illustrating one embodiment of an apparatus for alignment for wireless power transfer in accordance with one embodiment of the present invention.

FIG. 2 is a schematic block diagram illustrating one embodiment of an apparatus 200 for alignment for wireless power transfer in accordance with one embodiment of the present invention. The apparatus 200 includes one embodiment of an alignment apparatus 104 with an energy input module 202, a coupling measurement module 204, a coupling threshold module 206, and an alignment alert module 208, which are described below.

The apparatus 200, in one embodiment, includes an energy input module 202 that applies an amount of energy to the primary converter 106 of a WPT system, such as the systems 100, 101, 102 of FIGS. 1A, 1B, and 1C. The system 100, 101, 102 include the primary converter 106 with a primary transmitter pad 114 and a secondary converter 108 with a secondary receiver pad 120. The system 100, 101, 102 transfers energy from the primary transmitter pad 114 to the secondary receiver pad 120 and the secondary converter 108 provides power to a load 110.

In one embodiment, the energy input module 202 applies a fixed amount of energy to the primary converter 106. For example, the energy input module 202 may apply an amount of energy at a fixed for a specified period of time. In another example, the energy input module 202 may vary the rate energy is input to the primary converter 106 over a specified amount of time. In one embodiment, the energy input module 202 starts switching within the primary converter 106 and continues switching at a switching frequency for a specified amount of time. For example, the energy input module 202 may control switching of the H-bridge 118 of the primary converter 106 to turn on switching and then turn off switching at a specified time.

The apparatus 200, in one embodiment, includes a coupling measurement module 204 that measures a coupling coefficient between the primary transmitter pad 114 and the secondary receiver pad 120 when the primary transmitter pad 114 and the secondary receiver pad 120 are separated by a vertical distance and horizontally aligned at a horizontal position. The coupling measurement module 204 may measure bridge current $i_b$ and/or output voltage $V_{out}$ to determine the coupling coefficient. The coupling coefficient, in one embodiment, is calculated and, in another embodiment, is determined from known coupling coefficients correlated to bridge current $i_b$ and/or output voltages $V_{out}$.

The apparatus 200 includes a coupling threshold module 206 that determines if the coupling coefficient is above a coupling threshold. The coupling threshold, for example, is a coupling threshold that relates to a minimum acceptable WPT efficiency. In another embodiment, multiple coupling thresholds are available and the coupling threshold module 206 determines if the coupling coefficient is above a particular coupling threshold. For example, various coupling thresholds may relate to various levels of charging efficiency or may correlate to various method of alignment. For instance, one coupling threshold may relate to an alignment requiring movement of the vehicle while another coupling threshold may relate to movement of the secondary receiver pad 120 with respect to the vehicle where the secondary receiver pad 120 has a mechanism to facilitate movement with respect to the vehicle. One of skill in the art will recognize other relevant coupling thresholds.

The apparatus 200 includes an alignment alert module 208 that sends an alignment alert in response to the coupling coefficient being above the coupling threshold. For example, the alignment alert module 208 may notify a driver of the vehicle that the vehicle is properly aligned. The alignment alert may take many forms, such as a graphic depicting the vehicle, and receiver pad, an alert with text, an audible signal, lighting of a light bulb, etc.

In one embodiment, the energy input module 202 applies the amount of energy to the primary converter 106 under a no load condition between the secondary converter 108 and the load 110, where the WPT system provides substantially no power to the load 110 during the no load condition. In the embodiment, the alignment apparatus 104 operates prior to the WPT system providing power to the load 110. Typically, the WPT system operates while the system 100, 101, 102 is in a pre-charge condition while a movable object, such as a vehicle, with the secondary receiver pad 120 is being positioned and before the WPT system starts wireless power transfer for providing power to the load 110. The alignment apparatus 104 is designed, in one embodiment, to determine bridge current $i_b$ and/or output voltage $V_{out}$ on the output capacitor $C_{dc}$ without an attached load 110. Wireless power transfer prior to checking alignment conditions may result in poor system efficiency or other problems.

Figure 3:
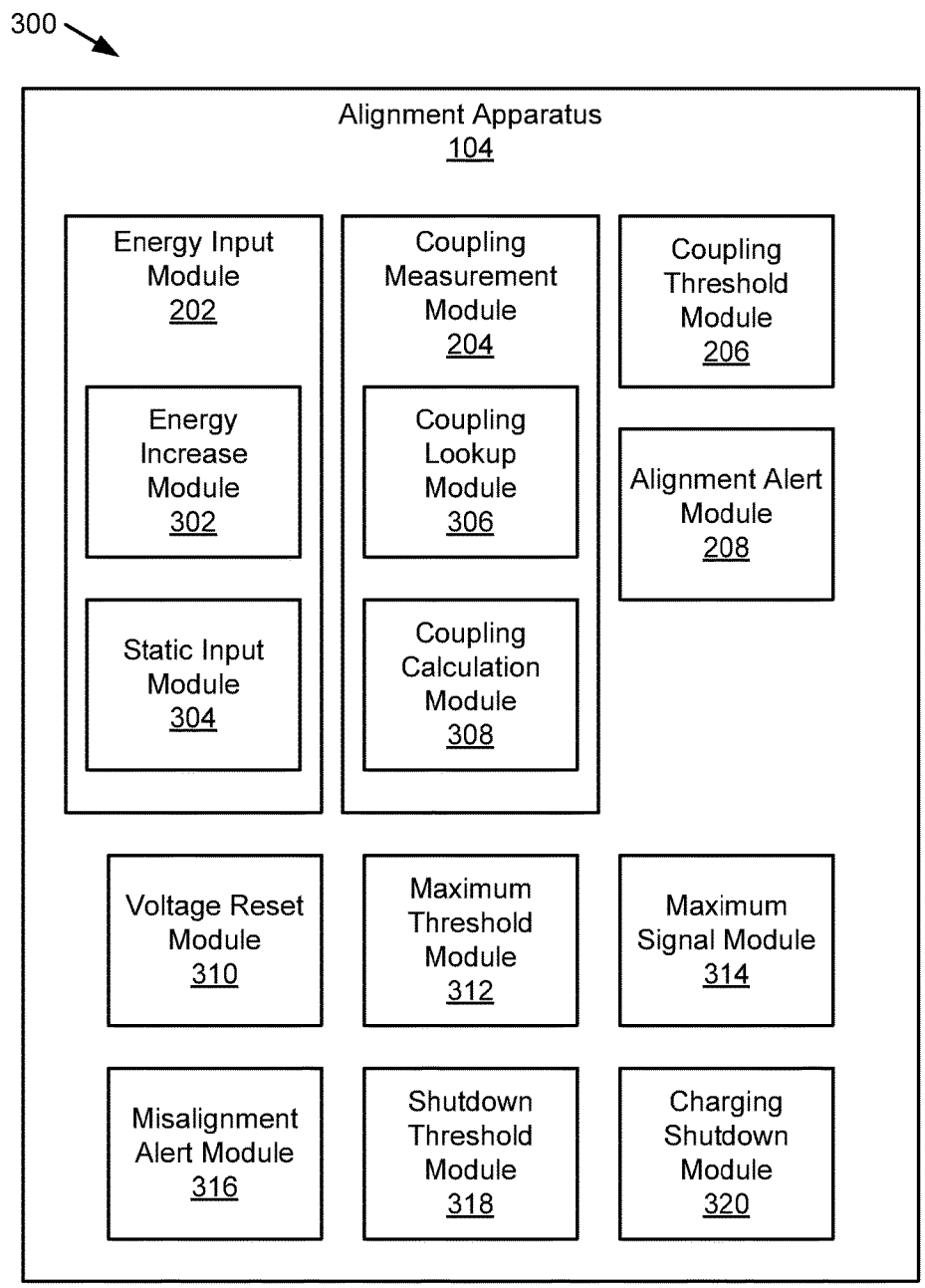
FIG. 3 is a schematic block diagram illustrating another embodiment of an apparatus for alignment for wireless power transfer in accordance with one embodiment of the present invention.

FIG. 3 is a schematic block diagram illustrating another embodiment of an apparatus 300 for alignment for wireless power transfer in accordance with one embodiment of the present invention. The apparatus 300 includes an embodiment of the alignment apparatus 104 with an energy input module 202, a coupling measurement module 204, a coupling threshold module 206, and an alignment alert module 208, which are substantially similar to those the described above in relation to the apparatus 200 of FIG. 2. In various embodiments, the apparatus 300 may also include in the energy input module 202, an energy increase module 302 and/or a static input module 304, a coupling coefficient module 204 with a coupling lookup module and/or a coupling calculation module 308, a voltage reset module 310, a maximum threshold module 312, a maximum signal module 314, a misalignment alert module 316, a shutdown threshold module 318, and/or a charging shutdown module 320, which are described below.

The apparatus 300, in one embodiment, includes, in the energy input module 202, an energy increase module 302 that applies the amount of energy to the primary converter 106 by increasing an amount of energy applied to the primary converter 106 over a specified amount of time. For example, the energy increase module 302 may linearly ramp energy to the primary converter 106. In another example, the energy increase module 302 may non-linearly ramp energy to the primary converter 106. The non-linear ramp may be an exponential increase, may be a linear ramp followed by a static energy input level, etc. In one embodiment, the energy increase module 302 increases an input voltage through an input voltage range. For example, the energy increase module 302 may ramp a voltage to the H-bridge 118.

In one embodiment, the primary converter 106 includes an H-bridge 118 and the H-bridge 118 is controlled using a phase angle duty cycle control technique. In the embodiment, the energy increase module 302 may increase a conduction angle through a conduction angle range. Typically an H-bridge 118 has a maximum duty cycle for each combination of switches of 0.5 so that the S1 and S4 switches are not on while the S2 and S3 switches are on. However, some switching techniques allow for some switching overlap. For typical situations, energy input to the primary converter 106 may be controlled by controlling duty cycle of a switching section of the primary converter 106. Where the switching section is an H-bridge 118, the duty cycle control may take many forms, such as symmetric voltage cancellation ("SVC") control, asymmetric voltage cancellation ("AVC") control, asymmetric duty cycle ("ADC") control, fixed conduction angle with variable voltage control, fixed conduction angle control, etc.

SVC control, for example, typically adjusts a conduction angle to regulate voltage, current, and/or power to the load 110. For SVC control, typically the switches S1-S4 are closed and opened in a sequence such that voltage is applied to converter elements symmetrically within a duty cycle to reduce total harmonic distortion ("THD"). SVC control may use conduction angle and/or variable input voltage to control power flow. AVC control is a variation of SVC and ADC and controls three variables. AVC control may be used with LCL converter topologies. AVC is described in U.S. patent application Ser. No. 13/642,925 titled "METHOD AND APPARATUS FOR CONTROLLING LCL CONVERTERS USING ASYMMETRIC VOLTAGE CANCELLATION TECHNIQUES" for Hunter Wu, et al. filed Oct. 23, 2012, which is incorporated herein by reference in its entirety. Other duty cycle control techniques may also be used. The energy increase module 302 may increase the duty cycle of the primary converter 106 over a specified range, either linearly or non-linearly.

In one embodiment, the energy input module 202 includes a static input module 304 that applies the amount of energy to the primary converter 106 using a fixed rate of energy input. For example, where duty cycle control is used, the static input module 304 may maintain the duty cycle at a fixed level. In another embodiment, the static input module 304 may also maintain an input voltage to the primary converter 106 or to the H-bridge 118 at a constant level. The energy increase module 302, by increasing energy to the primary converter 106 may be beneficial over a sudden change to a static energy input rate. For example, the sudden change to reach a static energy input rate may increase stress on components, may cause unwanted transients, etc. In one embodiment, the energy increase module 302 increases energy input to the primary converter 106 for a period of time and then the static input module 304 maintains a rate of energy input to the primary converter 106. For example, the energy increase module 302 may increase energy input to the primary converter 106 at a rate that avoids component stress, transients, etc. and to a particular duty cycle and then the static input module 304 may maintain the duty cycle at a fixed value.

In one embodiment, the static input module 304 applies energy to the primary converter 106 for a specified amount of time. Where both the energy increase module 302 and the static input module 304 are used, both may be limited in time so that a particular amount of energy is input to the primary converter 106. The energy input module 202 inputs a particular amount of energy, in one embodiment, to match conditions where a coupling coefficient was previously measured so that the coupling measurement module 204 may properly calculate or compare a coupling coefficient.

In another embodiment, the energy input module 202 applies energy for a specified amount of time so that the WPT system reaches a steady-state condition. The steady-state condition may be related to an amount of switching cycles of the primary converter 106. A switching cycle is related to a switching period where the switching period is typically an amount of time between when a switch of the primary converter 106 is turned on. A switching cycle is the rate that the switch is turned on, and is often expressed in hertz. For example, if the primary converter 106 includes a single switch, the switch may be turned on at a fixed periodic interval and duty cycle is an amount of time that the switch is on divided the switching period. When the primary converter 106 includes an H-bridge 118, a duty cycle of each pair of switches is typically less than 50%, as mentioned above. The specified period of time that the energy input module 202 inputs energy may be a certain number of switching cycles to allow the WPT system to reach a steady state.

In one embodiment, the energy input module 202 applies the amount of energy to the primary converter 106 during at least a quality factor ("Q") number of switching cycles of a switching period of the primary converter 106. The quality factor may be a number of switching cycles for the WPT system to reach a steady state condition after a transient condition. One way that a quality factor is expressed is:

$$Q = \frac{\omega L}{R} = \frac{1}{\omega CR}$$

for components in series, and $$Q = \frac{R}{\omega L} = \omega CR$$

for components in parallel, where $\omega = 2\pi f$ and f is frequency of a fundamental frequency of the AC waveform of the primary converter 106. L is inductance and R is resistance. A more complicated form of Q may be derived, but essentially Q is an amount of switching cycles for the WPT system to reach a steady state after a transient input, such as energy applied by the energy input module 202. For a well damped system with Q=1, the WPT system should reach a steady state after one switching cycle. For a less damped system, for example Q=4, the WPT system should reach a steady state after four switching cycles. For an even less damped system, for example Q=10, the WPT system should reach a steady state after ten switching cycles. The specified time that the energy input module 202 applies energy to the primary converter 106, in one embodiment, is longer than the Q of the WPT system, and specifically longer than a loaded Q of the WPT system. In one embodiment, the primary converter 106 operates with a switching frequency in a range of about 10 kilohertz ("kHz") and 200 kHz. In one embodiment, the primary converter 106 operates with a switching frequency of about 23.4 kilohertz. The energy input module 202 applies the amount of energy to the primary converter 106 over a specified amount of time, which may be in a range of about 10 microseconds to about 1 second, and in one embodiment, the specified time period may be about 1 millisecond ("mS"). The switching period for 23.4 kHz is about 43 µS or about 23.4 cycles for the specified time of 1 millisecond.

In one embodiment, the energy input module 202 applies the amount of energy to the primary converter 106 over a longer specified amount of time. Applying the energy to the primary converter 106, for example using the energy increase module 302 to ramp the energy input, may have a benefit that current and voltage in the system 100 may be in more of a steady-state condition. In the steady-state condition, the coupling coefficient may then relate directly to a ratio of output voltage $V_{out}$ to primary transmitter pad current $i_1$. Ramping the energy input over a shorter period, for example 1 mS, may have an error rate of 5% to 15% based on component variations where ramping the energy input over a longer period, for example 100 mS to 1 S, may be less sensitive to component variations and may have an error rate of less than 1%.

In one embodiment, the energy increase module 302 ramps input power within a range of about 50 mS to 5 S. In another embodiment, the energy increase module 302 ramps input power within a range of about 100 mS to 1 S. The ramp time may be chosen to minimize error due to component variation and other factors while minimizing a time required to determine a coupling coefficient. For example, where the secondary converter 108 is on a movable object, the movable object may be in a stopped state while the energy increase module 302 ramps the energy applied to the primary converter 106. Component size and design, switching frequency, and other factors of the primary converter 106 and secondary converter 108 may dictate a ramp time and longer or shorter ramp times may be used where the ramp operates essentially in a steady-state condition.

In one embodiment, the coupling measurement module 204 includes a coupling lookup module 306 that determines a coupling coefficient from a coupling coefficient table. The coupling coefficient table includes multiple entries of coupling coefficients. Each coupling coefficient in the coupling coefficient table is associated with a corresponding output voltage $V_{out}$ and/or a corresponding bridge current $i_b$. The coupling coefficient table may include entries for coupling coefficients, bridge currents $i_b$, and output voltages $V_{out}$ that have been measured previously for various vehicle heights, alignment conditions, initial conditions, etc. In another embodiment, the coupling coefficient table may include entries for coupling coefficients, bridge currents $i_b$, and output voltages $V_{out}$ that have been calculated, such as with a model similar to that shown in the system 102 of FIG. 1C. One of skill in the art will recognize other ways to calculate and/or measure coupling coefficients and associated bridge currents $i_b$ and output voltages $V_{out}$.

In one embodiment, the coupling measurement module 204 includes a coupling calculation module 308 that determines a coupling coefficient using a coupling coefficient formula where the output voltage $V_{out}$ and bridge current $i_b$ are variables and coupling coefficient is an output of the coupling coefficient formula. The embodiment may be applicable to situations where the energy increase module 302 increases energy over a relatively shorter time period, for where the apparatus 300 has not reached a steady-state condition. For example, where the primary converter 106 and secondary converter 108 are part of an LCL resonant inverter system such as that shown in the system 101 of FIG. 1B, a form of a coupling coefficient formula may be:

$$i_b = \frac{L_b L_m M R_2 V_1 s^2}{C_1 \beta \left( V_1 - \frac{L_m V_1 \sigma_3}{C_1 n^2 \left( L_b s + \frac{L_m \sigma_3}{C_1 n^2 \sigma_1 \sigma_2} \right) \sigma_1 \sigma_2} \right) \sigma_1 \left( R_2 + L_2 s + \frac{1}{C_2 s} \right) \sigma_2}$$

where:

$$\beta = L_b s + \frac{L_m \sigma_3}{C_1 n^2 \sigma_1 \sigma_2}$$

$$\sigma_1 = L_m s + \frac{\sigma_3}{C_1 n^2 s \sigma_2}$$

$$\sigma_2 = L_1 s + \frac{1}{C_1 s} + \frac{1}{C_{1s} s} - \frac{M^2 s^2}{R_2 + L_2 s + \frac{1}{C_2 s}}$$

$$\sigma_3 = L_1 s + \frac{1}{C_{1s} s} - \frac{M^2 s^2}{R_2 + L_2 s + \frac{1}{C_2 s}}$$

$$k = \frac{M}{\sqrt{L_1 \cdot L_2}}$$

and:
k coupling coefficient;
M Mutual inductance between primary transmitter pad and the secondary receiver pad;
$L_1$ Self-inductance of the primary transmitter pad;
$L_2$ Self-inductance of the secondary receiver pad;
$i_b$ Inductor current of inductor $L_b$;
$L_m$ Transformer magnetizing inductance;
$C_2$ Parallel tuning capacitor on a secondary resonant circuit of the secondary converter;
$C_{1s}$ Series tuning capacitor on a primary LCL load resonant converter of the primary converter;
$C_1$ Parallel tuning capacitor on the primary LCL load resonant converter;
$L_b$ Bridge inductance of LCL load resonant converter;
$R_2$ Initial output voltage divided by output current;
$V_1$ DC input voltage to the primary LCL load resonant converter;
s i·ω where i is an imaginary number
ω Angular operating frequency of primary converter in radians where ω=2πf;
f Operating frequency of the primary converter in hertz; and
n Turns ratio of a transformer in the primary converter.

One of skill in the art will recognize other forms of the equation. In the embodiment, an equivalent model of the system 101 of FIG. 1B may be the system 102 of FIG. 1C. Other topologies may be used and will have a formula for coupling coefficient that is different. Where a coupling calculation module 308 is used, the alignment apparatus 104 may require a significant amount of processing speed to calculate the coupling coefficient in a timely manner. A coupling lookup module 306 may be preferred to avoid lengthy calculation of a coupling coefficient, but may then require creation of a coupling coefficient table.

Typically, the energy input module 202 starts energy input from a steady-state condition. Typically the steady-state condition occurs prior to any wireless transfer or for conditions where components have zero current and zero voltage. In particular, the voltage on the output capacitor $C_{dc}$ is zero. In one embodiment, the apparatus 300 includes a voltage reset module 310 that resets a voltage on an output capacitor of the secondary converter 108 to an initial voltage before the energy input module 202 applies the amount of energy to the primary converter 106 and/or after the energy input module 202 applies the amount of energy to the primary converter 106.

For example, the energy input module 202 may apply the amount of energy to the primary converter 106 multiple times and the voltage reset module 310 may reset the output capacitor voltage after each time that the energy input module 202 applies the amount of energy to the primary converter 106. The voltage reset module 310 may reset the voltage on the output capacitor $C_{dc}$ to zero. The coupling measurement module 204 may then determine an average coupling coefficient based on the measurements associated with each time that the amount of energy is applied to the primary converter 106.

In one embodiment, the coupling threshold is a minimum coupling threshold and the apparatus 300 includes a maximum threshold module 312 and a maximum signal module 314. The maximum threshold module 312 determines if the coupling coefficient is above a maximum coupling threshold and the maximum signal module 314 sends a maximum threshold alert in response to the maximum threshold module 312 determining that the coupling coefficient is above the maximum coupling threshold. For example, under certain conditions the coupling coefficient may be too high signaling a dangerous resonant condition. The maximum threshold may correspond to an upper limit for the coupling coefficient. The high coupling coefficient, for example, may occur after some parameters of the system 100, 101, 102 have changed over time.

In another embodiment, the apparatus 300 includes a misalignment alert module 316 that sends a misalignment alert in response to the coupling coefficient being below the coupling threshold. For example, the misalignment alert may signal that the vehicle should be moved or that wireless power transfer should not occur. For a misalignment condition where the coupling coefficient is below the coupling threshold, the system 100, 101, 102 may charge with an efficiency that is unacceptable or wireless power transfer may not be possible. In one embodiment, the misalignment alert module 316 works together with the alignment alert module 208. For example, a misalignment alert may be a red light while an alignment alert may be a green light. In another example, the alignment apparatus 104 determines alignment a number of times, and possibly while the vehicle is moving, and the misalignment alert module 316 and alignment alert module 208 work together to provide near continuous feedback to a driver or to a graphical display of the vehicle and alignment conditions. One of skill in the art will recognize other ways that the alignment apparatus 104 may operate using the misalignment alert module 316 and alignment alert module 208 to provide alignment information.

In one embodiment, the primary converter 106 and the secondary converter 108 are bidirectional. For example, the rectification section 124 may include an H-bridge, similar to the H-bridge 118 of the primary converter 106. In the embodiment, power may be transmitted from the primary converter 106 to the secondary converter 108 or from the secondary converter 108 to the primary converter 106 by controlling switches in the H-bridges or with other control techniques. Other topologies may also be used to achieve bidirectional converters.

In the embodiment, the energy input module 202 may apply an amount of energy to the secondary converter 108 and the secondary converter 08 transfers energy from the secondary receiver pad 120 to the primary transmitter pad 114 of the primary converter 106 and the primary converter 106 provides power to a load during a measurement operation. For example, the primary converter 106 may include a load used solely for measurement of coupling coefficient or may include a load for other purposes. The primary converter 108 may include diodes, switches, and the like to switch between a load and a power source 112. During a reverse operation, the primary converter 106 transfers energy from the primary transmitter pad 114 to the secondary receiver pad 120 of the secondary converter 108 and the secondary converter 108 provides power to the load 110 during a load power operation.

The embodiment may be useful for safety to prevent accidental transmittal of power by the primary converter 106 when the movable object is not in position so that the secondary receiver pad 120 is in position for charging with respect to the primary transmitter pad 114. In the measurement operation, the secondary converter 108 may transmit a low amount of power compared to an amount of power provided during the load power operation. Controls may be put in place to prevent power transfer from the primary converter 106 to the secondary converter 108 until the measurement operation is complete and the coupling coefficient is in a specific range.

In one embodiment, the apparatus 300 includes a shutdown threshold module 318 that determines if the coupling coefficient is below a coupling shutdown threshold and a charging shutdown module 320 that stops the primary converter 106 from providing power in response to the coupling coefficient being below the coupling shutdown threshold. For example, the shutdown threshold module 318 may monitor the coupling coefficient while the primary converter 108 is in operation and may determine if the coupling coefficient is below a coupling shutdown threshold on a continual basis or at a sampling rate established for safety.

For example, the shutdown threshold module 318 may have a sampling rate dictated by safety standards. For example, the sampling rate may be 0.1 second, 1 second, 10 seconds, etc. In a condition where the shutdown threshold module 318 determines that the coupling coefficient is below a coupling shutdown threshold, the charging shutdown module 320 may then stop the primary converter 106 from providing power. For example, the charging shutdown module 320 may turn off the primary converter 108. By stopping power flow when the coupling coefficient is below the coupling shutdown threshold, the apparatus 300 may increase safety by preventing power flow during an unsafe condition, such as an object or person moving in the gap between the primary transmitter pad 114 and the secondary receiver pad 120, the movable object moving, etc.

In another embodiment, the coupling shutdown threshold may be a lower coupling shutdown threshold and the shutdown threshold module 318 determines if the coupling coefficient is above an upper coupling shutdown threshold. The charging shutdown module 320 may then stop the primary converter 106 from providing power in response to the coupling coefficient being above the upper coupling shutdown threshold. The coupling coefficient may increase, for example, when the movable object moves closer to the primary transmitter pad 114. In some instances, a coupling coefficient that is too high may cause damage.

Figure 4:
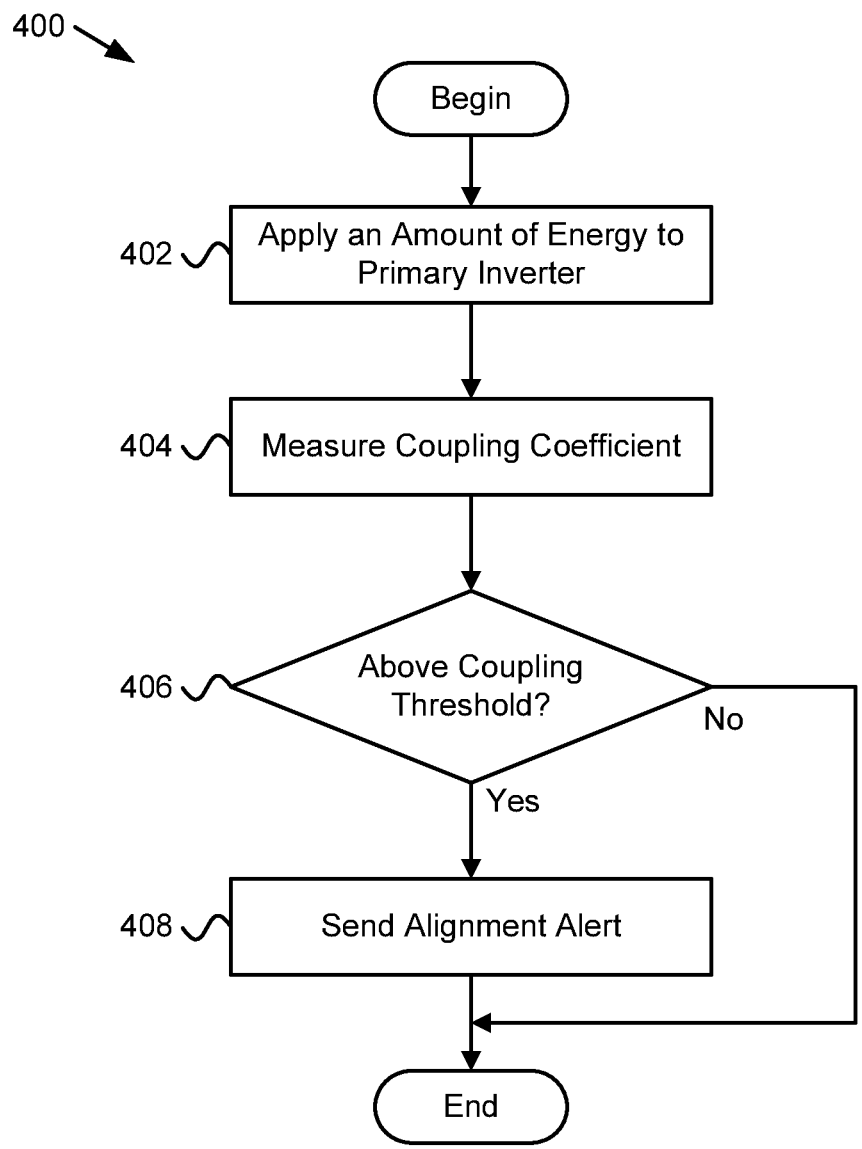
FIG. 4 is a flow chart diagram illustrating one embodiment of a method for alignment for wireless power transfer in accordance with one embodiment of the present invention.

FIG. 4 is a flow chart diagram illustrating one embodiment of a method 400 for alignment for wireless power transfer in accordance with one embodiment of the present invention. The method 400 begins and applies 402 an amount of energy to the primary converter 106 of a WPT system. The WPT system includes the primary converter 106 with a primary transmitter pad 114 and a secondary converter 108 with a secondary receiver pad 120. The WPT system transfers energy from the primary transmitter pad 114 of the primary converter 106 to the secondary receiver pad 120 of the secondary converter 108 and the secondary converter 108 provides power to a load 110.

The method 400 measures 404 a coupling coefficient between the primary transmitter pad 114 and the secondary receiver pad 120 when the primary transmitter pad 114 and the secondary receiver pad 120 are separated by a vertical distance and horizontally aligned at a horizontal position. The method 400 determines 406 if the coupling coefficient is above a coupling threshold. If the method 400 determines 406 that the coupling coefficient is not above a coupling threshold, the method 400 ends. If the method 400 determines 406 that the coupling coefficient is above a coupling threshold, the method 400 sends 408 an alignment alert, and the method 400 ends.

Figure 5:
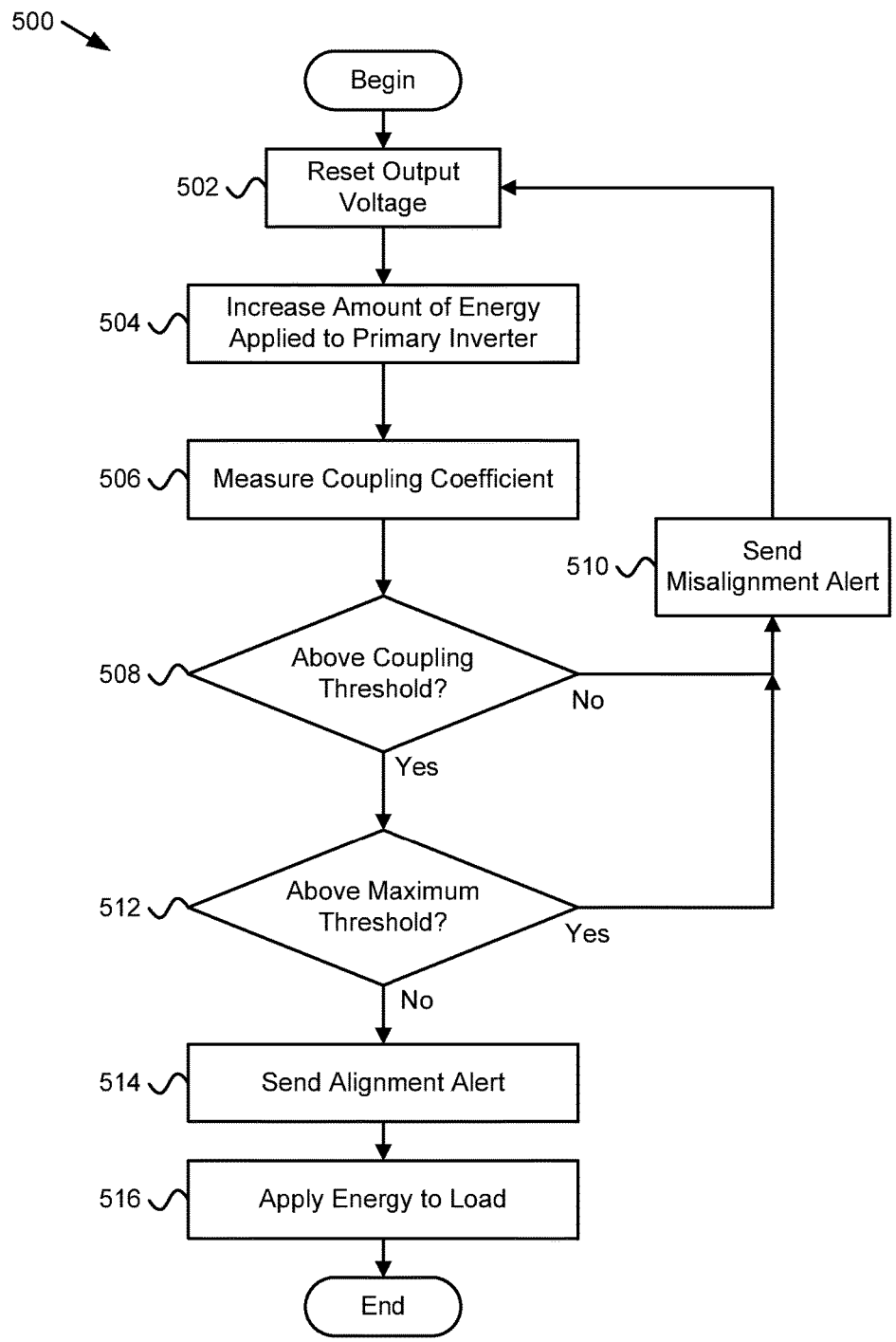
FIG. 5 is a flow chart diagram illustrating one embodiment of another method for alignment for wireless power transfer in accordance with one embodiment of the present invention.

FIG. 5 is a flow chart diagram illustrating one embodiment of another method 500 for alignment for wireless power transfer in accordance with one embodiment of the present invention. The method 500 begins and resets 502 an output voltage $V_{out}$ across the output capacitor $C_{dc}$. The method 500 increases 504 an amount of energy applied to the primary converter 106 and measures 506 the coupling coefficient of the primary transmitter pad 114 and secondary receiver pad 120. The method 500 determines 508 if the coupling coefficient is above the coupling threshold. If the method 500 determines 508 that the coupling coefficient is not above the coupling threshold, the method 500 sends 510 a misalignment alert and returns to reset 502 the output voltage $V_{out}$ across the output capacitor $C_{dc}$.

If the method 500 determines 508 that the coupling coefficient is above the coupling threshold, the method 500 determines 512 if the coupling coefficient is above a maximum coupling threshold. If the method 500 determines 512 that the coupling coefficient is above a maximum coupling threshold, the method 500 sends a misalignment alert and returns to reset 502 the output voltage $V_{out}$ across the output capacitor $C_{dc}$. If the method 500 determines 512 that the coupling coefficient is not above a maximum coupling threshold, the method 500 sends 514 and alignment alert and applies 516 wireless power transfer energy to the load 110, and the method 500 ends.

Figure 6:
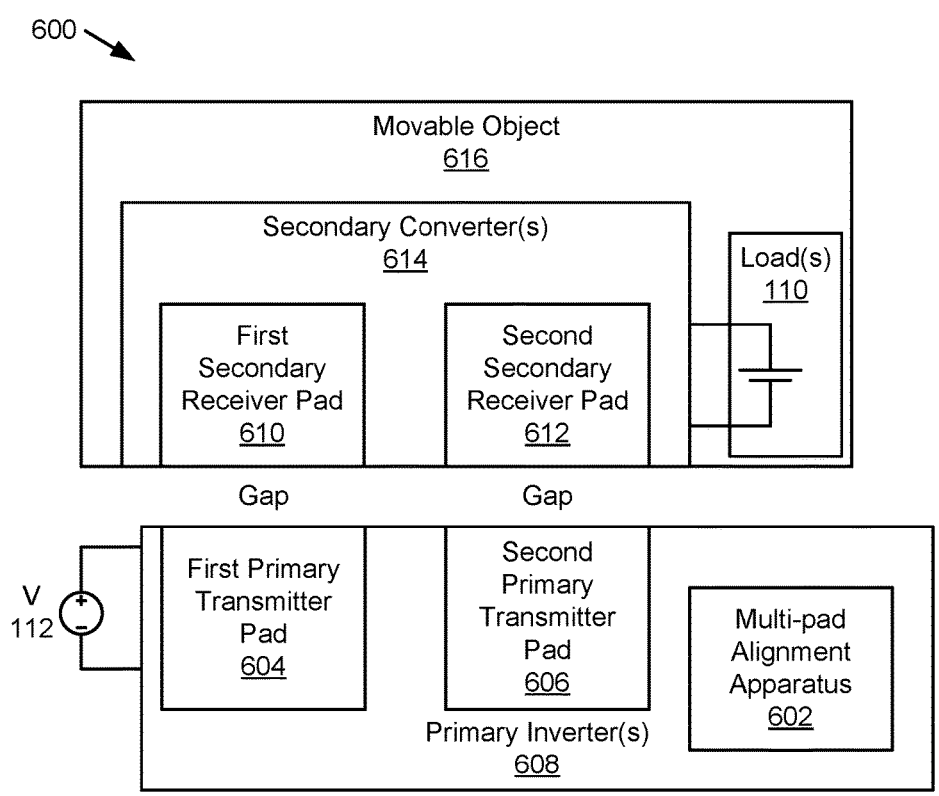
FIG. 6 is a schematic block diagram illustrating one embodiment of a system for alignment for wireless power transfer using multiple receiver pads in accordance with one embodiment of the present invention.

FIG. 6 is a schematic block diagram illustrating one embodiment of a system 600 for alignment for wireless power transfer using multiple receiver pads in accordance with one embodiment of the present invention. The system 600 includes a multi-pad alignment apparatus 602 with a first primary transmitter pad 604 and a second primary transmitter pad 606 in one or more primary transmitters 608, a first secondary receiver pad 610 and a second secondary receiver pad 612 in one or more secondary converters 614, a load 110, a moveable object 616, and a power source 112, which are described below.

The system 600 includes a multi-pad alignment apparatus 602 that provides alignment information for a movable object 616, such as a vehicle. The multi-pad alignment apparatus 602 determines coupling coefficients between the first primary transmitter pad 604 and first secondary receiver pad 610 and second primary transmitter pad 606 and second secondary receiver pad 612 to determine the alignment information. The multi-pad alignment apparatus 602 is shown as part of the one or more primary converters 608, but all or a portion of the multi-pad alignment apparatus 602 may be included with the movable object 616 or one or more secondary converters 614. The multi-pad alignment apparatus 602 will be described in more detail with regard to the apparatus 700 of FIG. 7.

The system 600 includes a first primary transmitter pad 604 and a second primary transmitter pad 606. In one embodiment, the first primary transmitter pad 604 and a second primary transmitter pad 606 are substantially similar to the primary transmitter pad 114 described above with regard to the systems 100, 101, 102 and apparatuses 200, 300 of FIGS. 1A, 1B, 1C, 2 and 3. In another embodiment, the first primary transmitter pad 604 and a second primary transmitter pad 606 may differ from the primary transmitter pad 114 describe above. For example, the first primary transmitter pad 604 and a second primary transmitter pad 606 may be physically different than the receiver pad 114 described above and may be solely designed for alignment instead of alignment and wireless power transfer. Alignment information from two or more receiver pads may allow more precise alignment of the movable object 616 and may provide more alignment information than a WPT system with a single set of transfer pads.

In one embodiment, the first primary transmitter pad 604 and a second primary transmitter pad 606 may be mounted in a fixed location with a fixed amount of spacing. For example, the first primary transmitter pad 604 and a second primary transmitter pad 606 may be mounted in the ground, in a driving surface, or similar location where the movable object 616 may be positioned over the first primary transmitter pad 604 and a second primary transmitter pad 606. The first primary transmitter pad 604 and a second primary transmitter pad 606 may be flush with the ground, below the surface, such as below concrete or asphalt, or may be raised.

Typically, when the movable object 616 is a vehicle, the first primary transmitter pad 604 and a second primary transmitter pad 606 are positioned in a driving path of the vehicle and are specifically placed in relation to the driving direction of the vehicle. Typically, the location and spacing of the first primary transmitter pad 604 and a second primary transmitter pad 606 match a location and spacing of the first secondary receiver pad 610 and a second secondary receiver pad 612 mounted on the movable object 616. In one embodiment, the first primary transmitter pad 604 and a second primary transmitter pad 606 are placed in line with a direction of travel of movable object 616. In another embodiment, the first primary transmitter pad 604 and a second primary transmitter pad 606 are placed perpendicular to a direction of travel of movable object 616. Typically the first primary transmitter pad 604 and a second primary transmitter pad 606 have a top surface that is in a horizontal plane and are spaced apart a horizontal distance.

The system 600 also includes one or more primary inverters 608 that include the first primary transmitter pad 604 and a second primary transmitter pad 606. The one or more primary inverters 608 convert energy from a power source 112 to a form suitable for transfer to the first and second primary transmitter pads 604, 606. The power source 112 is substantially similar the power source 112 described above. In one embodiment, the first primary transmitter pad 604 and a second primary transmitter pad 606 have a separate primary inverter 608. In another embodiment, the first primary transmitter pad 604 and a second primary transmitter pad 606 are included with a single primary inverter 608. In one embodiment, the one or more primary inverters 608 are substantially similar to the primary inverter 106 of systems 100, 101, 102 and apparatuses 200, 300 of FIGS. 1A, 1B, 1C, 2 and 3.

The system 600 includes a first secondary receiver pad 610 and a second secondary receiver pad 612 that are included with a movable object 616. Typically each of the first secondary receiver pad 610 and the second secondary receiver pad 612 include a bottom surface that is positioned on the movable object to be parallel to a top surface of the first primary transmitter pad 604. The first secondary receiver pad 610 and the second secondary receiver pad 612 are placed a horizontal distance apart and are typically placed to match a layout of the first primary transmitter pad 604 and a second primary transmitter pad 606 so that alignment of the first and second secondary receiver pads 610, 612 and first and second primary transmitter pads 604, 606 will result in alignment of the movable object 616 and may result in more efficient WPT charging than a misalignment condition. In one embodiment, the first and second secondary receiver pads 610, 612 are substantially similar to the secondary receiver pad 120 described above in relation to the systems 100, 101, 102 and apparatuses 200, 300 of FIGS. 1A, 1B, 1C, 2 and 3.

The system 600 includes one or more secondary converters 614 that include or are connected to the first and second secondary receiver pads 610, 612. In one embodiment, the system includes a separate secondary converter 614 for each of the first secondary receiver pad 610 and second secondary receiver pad 612. In another embodiment, the system 600 includes a single secondary converter 614 connected to both the first secondary receiver pad 610 and second secondary receiver pad 612. In another embodiment, the secondary converter 614 is substantially similar to the secondary converter 108 described above in relation to the systems 100, 101, 102 and apparatuses 200, 300 of FIGS. 1A, 1B, 1C, 2 and 3, and may include a secondary LCL network 122 and/or a rectification section 124. The one or more secondary converters 108, in one embodiment, facilitate energy transfer from the first and second secondary receiver pads 610, 612 to one or more loads 110. In another embodiment, one or more secondary converters 108 provide alignment information but are not connected to a load 110 for wireless power transfer.

The system 600 includes one or more loads 110. In one embodiment, the one or more loads 110 are for power consumption for the movable object 616 and may include motors, power storage, such as a battery 126, etc. The one or more loads 110, in one embodiment, are substantially similar to the systems 100, 101, 102 and apparatuses 200, 300 of FIGS. 1A, 1B, 1C, 2 and 3. While a first and a second primary transmitter pads 604, 606 and corresponding first and second secondary receiver pads 610, 612 are depicted in FIG. 6, one of skill in the art will recognize that more than two primary transmitter and secondary receiver pads are possible. Other possible configurations are described in relation to FIGS. 9A and 9B.

Figure 7:
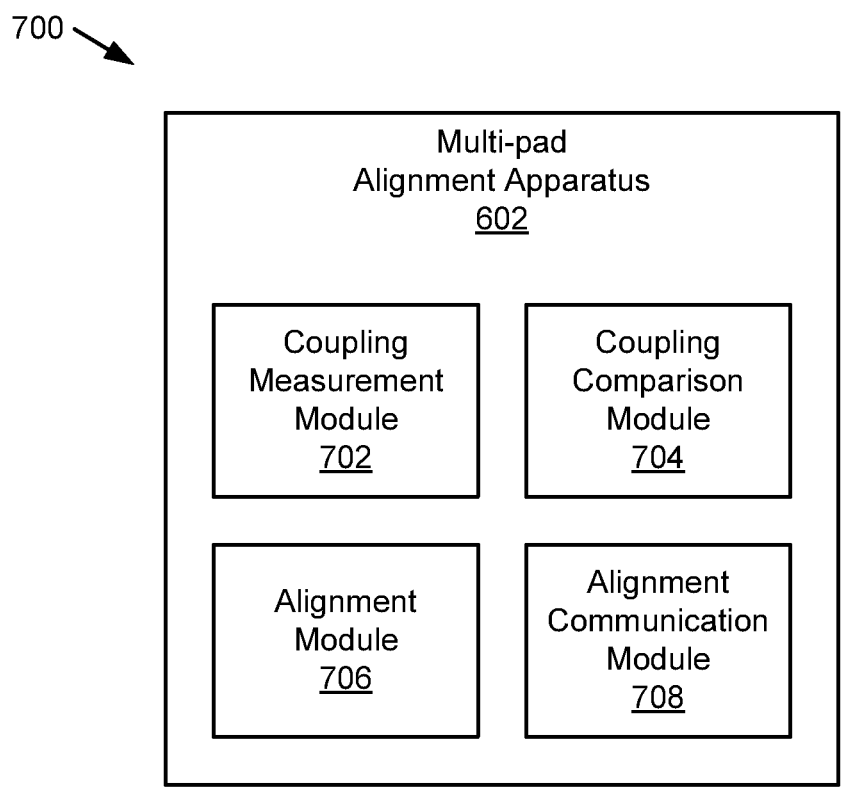
FIG. 7 is a schematic block diagram illustrating one embodiment of an apparatus for alignment for wireless power transfer using multiple receiver pads in accordance with one embodiment of the present invention.

FIG. 7 is a schematic block diagram illustrating one embodiment of an apparatus 700 for alignment for wireless power transfer using multiple receiver pads in accordance with one embodiment of the present invention. The apparatus 700 includes one embodiment of the multi-pad alignment apparatus 602 with a coupling measurement module 702, a coupling comparison module 704, an alignment module 706, and an alignment communication module 708, which are described below.

In the apparatus 700, in one embodiment, includes a coupling measurement module 702 that measures, for each set of receiver pads, a coupling coefficient. A set of receiver pads includes a primary transmitter pad, i.e. the first primary transmitter pad 604, mounted in a fixed location and a secondary receiver pad, i.e. the first secondary receiver pad 610, mounted on a movable object 616, such as a vehicle. The primary transmitter pad of a set of receiver pads transmits power wirelessly to the secondary receiver pad of the set of receiver pads. The movable object 616 includes two or more secondary receiver pads, e.g. 610, 612, each corresponding to a primary transmitter pad, e.g. 604, 606, mounted in a fixed location. The coupling measurement module 702 may measure a coupling coefficient for any number of sets of receiver pads.

In one embodiment, the set of receiver pads are part of an LCL resonant inverter system. For example, the sets of receiver pads may be substantially similar to those described above in relation to the systems 100, 101, 102 and apparatuses 200, 300 of FIGS. 1A, 1B, 1C, 2 and 3. In addition, the coupling measurement module 702 may measure a coupling coefficient in a manner similar to the apparatuses 200, 300 of FIGS. 2 and 3. For example, the coupling coefficients may be measured by measuring bridge current $i_b$ and/or output voltage $V_{out}$, which may be used to calculate or lookup a coupling coefficient. In another embodiment, the sets of receiver pads are part of a WPT system that measures coupling coefficients differently than those described above.

The apparatus 700 includes, in one embodiment, a coupling comparison module 704 that compares, for each set of receiver pads, the measured coupling coefficient with one or more pre-determined coupling coefficients to determine an alignment of each set of receiver pads. The predetermined coupling coefficients correspond to various alignment conditions of a set of receiver pads. For example, where the system 600 includes two sets of receiver pads as depicted above in FIG. 6, the coupling comparison module 704 may compare a coupling coefficient of the first primary transmitter pad 604 and first secondary receiver pad 610 with a known coupling coefficient either a calculated coupling coefficient or coupling coefficients in a coupling coefficient table. The known coupling coefficients, for example, may be for a particular vertical distance, known material in the gap, etc. between the receiver pads of a set of receiver pads (e.g. first primary transmitter pad 604 and first secondary receiver pad 610).

In one embodiment, the coupling comparison module 704 compares a measured coupling coefficient with a single, pre-determined coupling threshold. For example, the coupling comparison module 704 may operate similar to the coupling threshold module 206 of the apparatuses 200, 300 of FIGS. 2 and 3. In another embodiment, the coupling comparison module 704 compares a measured coupling coefficient with multiple, pre-determined coupling thresholds, each corresponding to a particular alignment condition. Again the coupling comparison module may operate similar to the coupling threshold module 206 described above, but with various coupling thresholds. In another embodiment, the coupling comparison module 704 compares a measured coupling coefficient with a pre-determined calculated coupling coefficient where the calculated coupling coefficient correlates to a particular alignment condition. A pre-determined coupling coefficient is typically a coupling coefficient for a known condition, such as a particular vertical height and misalignment. One of skill in the art will recognize other ways for the coupling comparison module 704 to compare a measured coupling coefficient with a pre-determined coupling coefficient for each set of receiver pads.

The apparatus 700 includes an alignment module 706 that determines an alignment of the movable object 616 based on the determined alignments of the sets of receiver pads. For example, the alignment module 706 may determine that the movable object 616 is aligned or misaligned. For example, if the coupling comparison module 704 determines that the measured coupling coefficient for a first set of receiver pads (i.e. 604, 610) is above a coupling threshold and that the measured coupling coefficient for a second set of receiver pads (i.e. 606, 612) is below a coupling threshold, the alignment module 706 may determine that the vehicle is misaligned. In the embodiment, one or both of the first and second sets of receiver pads (i.e. 604, 610 and 606, 612) having a measured coupling coefficient below a coupling threshold would result in a misalignment condition and both of the first and second sets of receiver pads (i.e. 604, 610 and 606, 612) having a measured coupling coefficient above a coupling threshold would result in an alignment condition.

In another embodiment, the alignment module 706 determines alignment for each set of receiver pads separately. For example, the alignment module 706 returns alignment of each set of receiver pads separately for separate evaluation of alignment for each set of receiver pads. In another embodiment, the alignment module 706 determines alignment for each set of receiver pads by determining an amount of misalignment for each set of receiver pads. For example, where the coupling comparison module 704 compares a measured coupling coefficient with several pre-determined coupling coefficients, the alignment module 706 may determine an amount of misalignment, depending on which of the several coupling coefficients measured coupling coefficient is above. In another embodiment, where the coupling comparison module 704 compares the measured coupling coefficient with a calculated coupling coefficient and/or a calculated amount of misalignment, the alignment module 706 may return a particular alignment condition for a set of receiver pads.

In one embodiment, the apparatus 700 includes an alignment communication module 708 that communicates alignment of the movable object 616. For example, the alignment communication module 708 may communicate alignment information to a user, a computer system, a driver when the movable object 616 is a vehicle, and the like. The alignment communication module 708 may communicate the alignment information in a variety of ways. For example, the alignment communication module 708 may communicate alignment of the movable object 616 by a graphical representation of the movable object 616 and an amount of alignment or misalignment. In another embodiment, the alignment communication module 708 may communicate alignment of the movable object 616 by an amount of alignment or misalignment of each set of receiver pads. In another embodiment, the alignment communication module 708 may communicate alignment of the movable object 616 by text indicating alignment or misalignment. In another embodiment, the alignment communication module 708 may communicate alignment of the movable object 616 by an audio signal indicating alignment or misalignment.

In one embodiment, the alignment communication module 708 may communicate alignment of the movable object 616 by a direction of misalignment. For example, the sets of receiver pads may include a layout that allows determination of a direction of misalignment in addition to an amount of misalignment and the alignment module 706 may determine the direction of misalignment so that the alignment communication module 708 may communicate a direction of misalignment.

In one embodiment, each primary transmitter pad and corresponding secondary receiver pad is paired using a unique identifier. For example, each primary transmitter pad (e.g. 604, 606) or associated equipment may transmit a unique identifier so that each corresponding secondary receiver pad may verify that power received wirelessly from a correct primary transmitter pad. For example, the coupling measurement module 702 may measure a coupling coefficient of a set of receiver pads (i.e. 604, 610) without measuring a coupling coefficient of a primary transmitter pad of a first set (i.e. 604) and a secondary receiver pad of a second set (i.e. 612). In one embodiment, the unique identifier is added to an AC waveform of the primary transmitter pad so that the AC waveform acts as a carrier for the unique identifier. The secondary converter 614 may have decoding components to determine the unique identifier transmitted by the primary transmitter pad. In another embodiment, each set of receiver pads operates with a different fundamental frequency, which operates as the unique identifier. In another embodiment, the unique identifier is transmitted separately from the wireless power transfer of a set of receiver pads. One of skill in the art will recognize other ways to distinguish sets of receiver pads.

Figure 8:
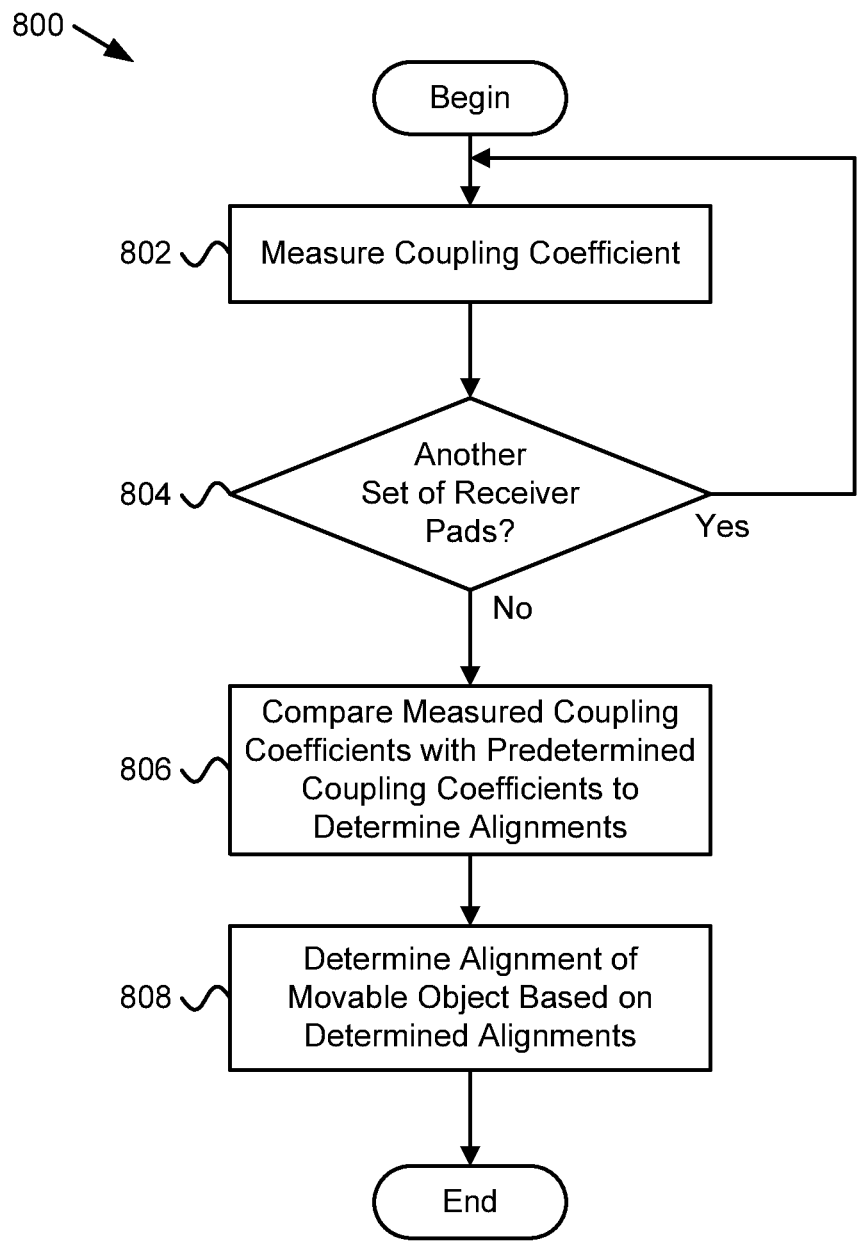
FIG. 8 is a flow chart diagram illustrating one embodiment of a method for alignment for wireless power transfer using multiple receiver pads in accordance with one embodiment of the present invention.

FIG. 8 is a flow chart diagram illustrating one embodiment of a method 800 for alignment for wireless power transfer using multiple receiver pads in accordance with one embodiment of the present invention. The method 800 begins and measures 802 a coupling coefficient for a set of receiver pads. A set of receiver pads includes a primary transmitter pad mounted in a fixed location and a secondary receiver pad mounted on a movable object. The primary transmitter pad of a set of receiver pads transmits power wirelessly to the secondary receiver pad of the set of receiver pads. The movable object 616 includes two or more secondary receiver pads, each corresponding to a primary transmitter pad mounted in a fixed location. The method 800 determines 804 if there is another set of receiver pads to measure 802 a coupling coefficient. If the method 800 determines 804 that there is another set of receiver pads to measure 802 a coupling coefficient, the method 800 returns and measures 802 the coupling coefficient for the next set of receiver pads.

If the method 800 determines 804 that there is not another set of receiver pads to measure 802 a coupling coefficient, the method 800 compares 806, for each set of receiver pads, the measured coupling coefficient with one or more pre-determined coupling coefficients to determine an alignment of each set of receiver pads. The predetermined coupling coefficients corresponding to various alignment conditions of a set of receiver pads. The method 800 determines 808 an alignment of the movable object 616 based on the determined alignments of the sets of receiver pads, and the method 800 ends.

Figure 9A:
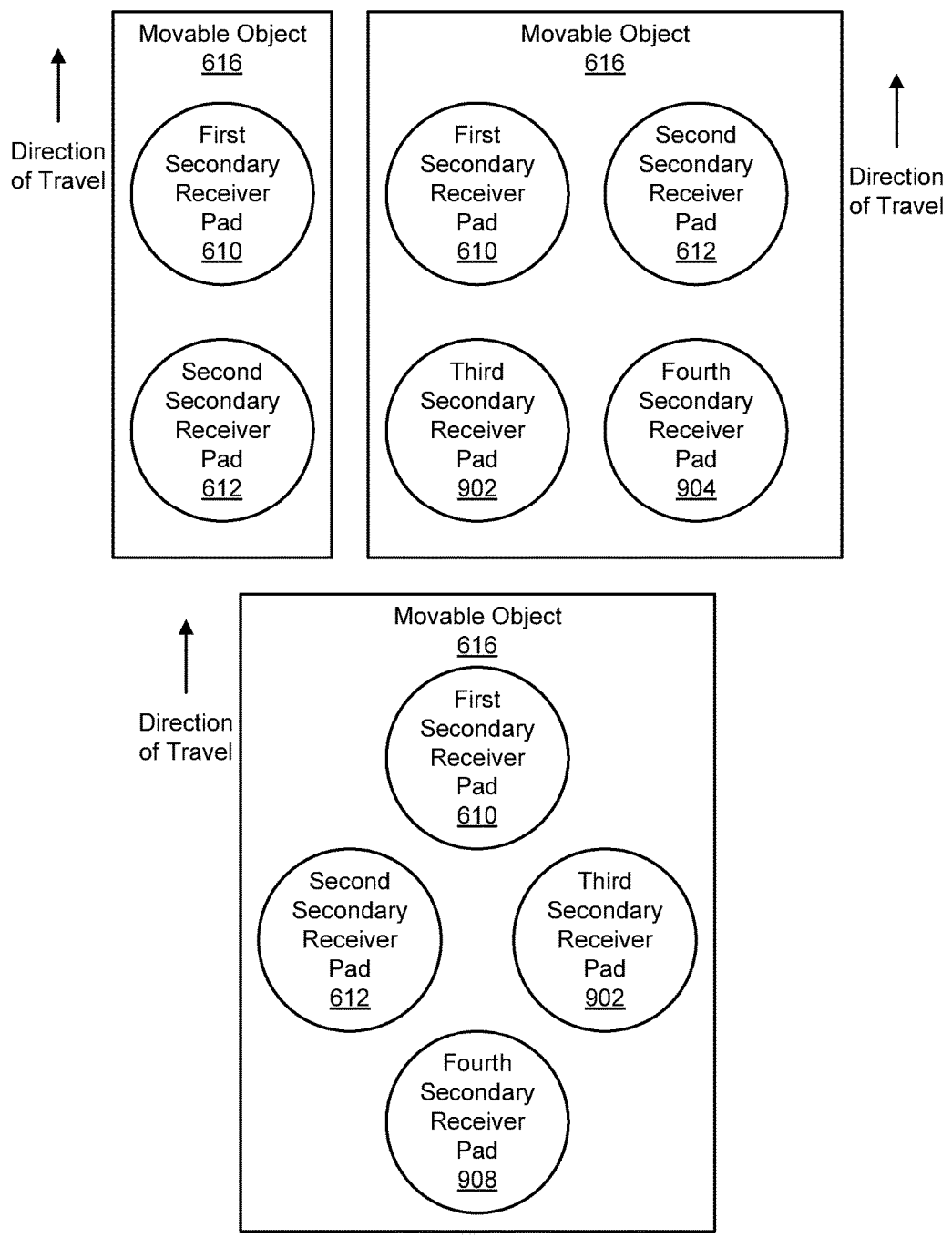
FIG. 9A is a schematic block diagram illustrating layouts of secondary receiver pads in a movable object in accordance with one embodiment of the present invention.

FIG. 9A is a schematic block diagram illustrating layouts of secondary receiver pads in a movable object in accordance with one embodiment of the present invention. In the top left corner, FIG. 9A includes a movable object, such as a vehicle, with a first secondary receiver pad 610 at a front of the vehicle (i.e. front toward a typical direction of travel, as indicated) and a second secondary receiver pad 612 at a rear of the movable object 616, or at least behind, the first secondary receiver pad 610. Typically a first primary transmitter pad 604 and a second primary transmitter pad 606 are positioned with a similar spacing and alignment so that when the movable object 616 is above the primary transmitter pads 604, 606, the sets of receiver pads (i.e. 604, 610 and 606, 612) are directly aligned. In another embodiment (not shown), the first and second secondary receiver pads 610, 612 are side-by-side and perpendicular to the direction of travel.

The diagram at the top right of FIG. 9A depicts another pattern where there are four sets of receiver pads for a movable object 616. In the embodiment, the secondary receiver pads 610, 612, 902, 904 are in a square pattern with respect to the direction of travel. The bottom diagram in FIG. 9A depicts four sets of receiver pads where the secondary receiver pads 610, 612, 902, 904 in a diamond pattern, with respect to the direction of travel. Again, typically each of the depicted embodiments with four sets of receiver pads would have primary transmitter pads in a same pattern and spacing. The patterns and spacing shown in FIG. 9A, of course, may differ based on the shape and characteristics of the movable object 616.

In other embodiments, the pattern of the transmitter and receiver pads may be in other shapes, such as oval, elliptical, circular, etc. The transmitter and receiver pads may also be in various shapes, such as circular as shown, elliptical, oval, square or other shape known to those of skill in the art. Other pad designs may be custom based on particular needs of a location or movable object.

Figure 9B:
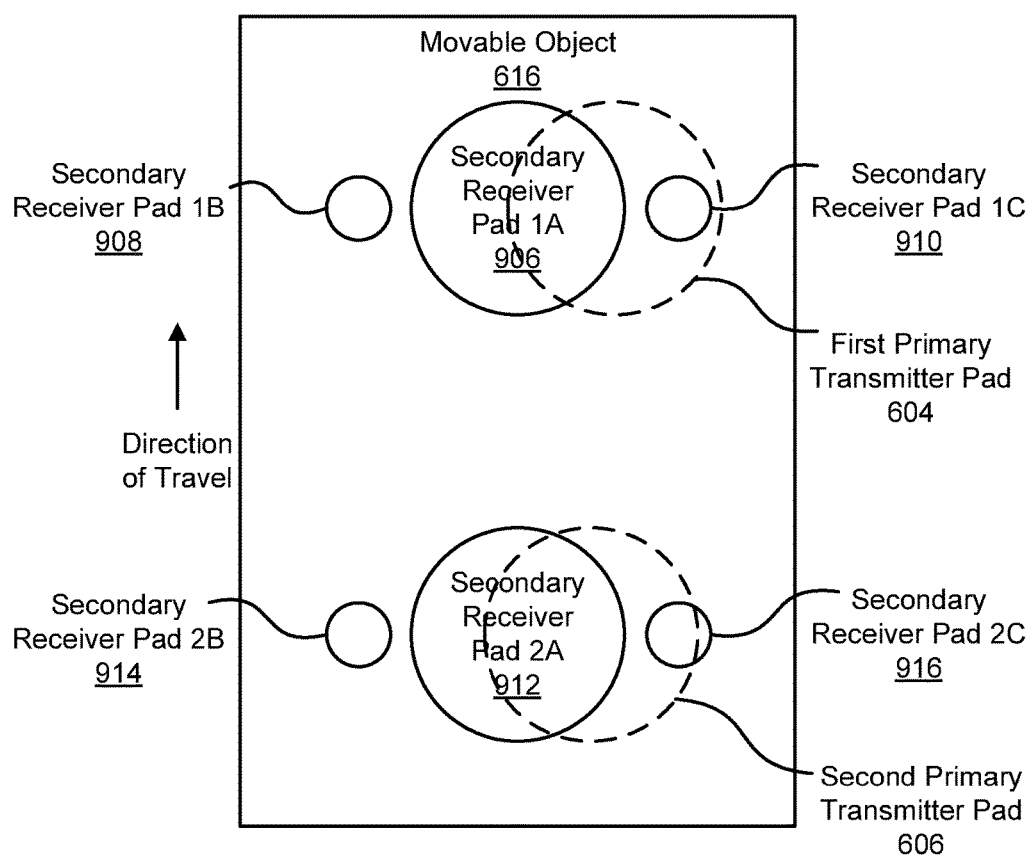
FIG. 9B is a schematic block diagram illustrating another layout of secondary receiver pads in a movable object in accordance with one embodiment of the present invention.

FIG. 9B is a schematic block diagram illustrating another layout of secondary receiver pads in a movable object in accordance with one embodiment of the present invention. In the depicted embodiment, the movable object 616 includes secondary receiver pads 906-916 where there are three secondary receiver pads, i.e. secondary receiver pad 1A 906, secondary receiver pad 1B 908, and secondary receiver pad 1C 910 at the front of the movable object 616 and three secondary receiver pads, i.e. secondary receiver pad 2A 912, secondary receiver pad 2B 914, and secondary receiver pad 2C 916 at the rear of the movable object 616. In one embodiment, a center secondary receiver pad, i.e. 906, 912 are sized for wireless power transfer and the secondary receiver pads on either side are smaller and may be for alignment and not for wireless power transfer.

In one example, a first primary transmitter pad 604 and a second primary transmitter pad 606 may be mounted in a fixed location without any primary transmitter pads to either side. Where there is a misalignment, for example if the movable object 616 is positioned as depicted where the secondary receiver pad 1A 906 and the second receiver pad 1C 910 are both over the first primary transmitter pad 604, the coupling measurement module 702 may measure a coupling coefficient for the secondary receiver pad 1A 906 and first primary transmitter pad 604 and secondary receiver pad 1C 910 and first primary transmitter pad 604 and may not be able to measure a coupling coefficient for the second receiver pad 1B 908, which may result in knowing that the movable object is positioned to the right of a desired position where the secondary receiver pad 906 and the first primary transmitter pad 604 are aligned. The coupling comparison module 704 may compare the measured coupling coefficients to predetermined coupling coefficients and the alignment module 706 may then determine an amount that the movable object is too far to the right. In other embodiments, the secondary receiver pads to the side (i.e. 908, 910, 914, 916) are sized the same as the center secondary receiver pads (i.e. 906, 912). One of skill in the art will recognize other ways to utilize measurements of coupling coefficients for multiple secondary receiver pads and a primary transmitter pad for alignment.

Figure 10:
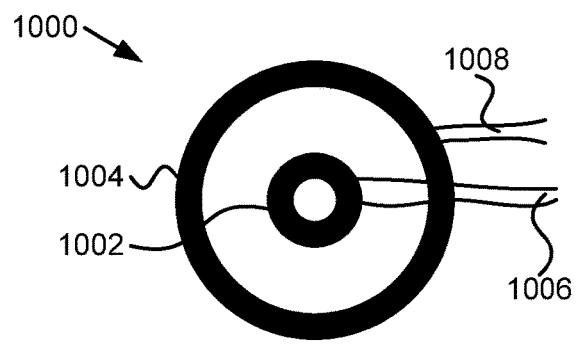
FIG. 10 is a schematic block diagram illustrating a design of a first primary transmitter pad and a second primary transmitter pad or a first secondary receiver pad and a second secondary receiver pad in accordance with one embodiment of the present invention.

FIG. 10 is a schematic block diagram illustrating a design 1000 of a first primary transmitter pad and a second primary transmitter pad or a first secondary receiver pad and a second secondary receiver pad in accordance with one embodiment of the present invention. The design 1000 includes a first receiver pad 1002 within a second receiver pad 1004. In one embodiment, the first receiver pad 1002 is a first primary transmitter pad and the second receiver pad 1004 is a second primary transmitter pad. The first receiver pad 1002 may have a set of leads 1006 and the second receiver pad 1004 may have a set of leads 1008 for connection to a primary converter or secondary converter. In another embodiment, the first and second receiver pads 1002, 1004 may be first and second secondary receiver pads 1116, 1118. For example, the size and shape of the primary transmitter pads may match the size and shape of the secondary receiver pads. While the first and second receiver pads 1002, 1004 are shown to be round, other receiver pad shapes are contemplated. In addition, while the first receiver pad 1002 is shown in the center of the second receiver pad 1004, other designs are contemplated, for example, as shown in FIGS. 9A and 9B.

The first receiver pad 1002 may be physically smaller to fit within the second receiver pad 1004. For example, the first receiver pad 1002 and second receiver 1004 may be designed so that the first and second receiver pads 1002, 1004 have minimal interaction or interference. In another embodiment, the second receiver pad 1004 is larger to transmit more power. In another embodiment, the first and second receiver pads 1002, 1004 are operated separately. For example, a pair of first receiver pads 1002 in the form of a first primary transmitter pad and a second primary transmitter pad may be used in an alignment operation while a pair of second receiver pads 1004 in the form of a second primary transmitter pad and a secondary receiver pad are used in a load power operation to provide power to a load 110. In one embodiment, a first coupling coefficient is calculated for a pair of first receiver pads 1002 and a second coupling coefficient is calculated for a pair of second receiver pads 1004 and the first and second coupling coefficients are used to determine alignment.

The first receiver pad 1002 in the form of a pair of primary transmitter and secondary receiver pads as well as the second receiver pad 1004 in the form of another pair of primary transmitter and secondary receiver pads may be substantially similar to those described above in relation to the systems 100, 101, 102 and apparatuses 200, 300, 600 and 700 described above. For example, the first and second receiver pads 1002, 1004 may be used to determine if a coupling coefficient is above or below a coupling threshold. One of skill in the art will recognize other ways to utilize the first and second receiver pads 1002, 1004 as described above in the systems 100, 101, 102 and apparatuses 200, 300, 600 and 700.

Figure 11:
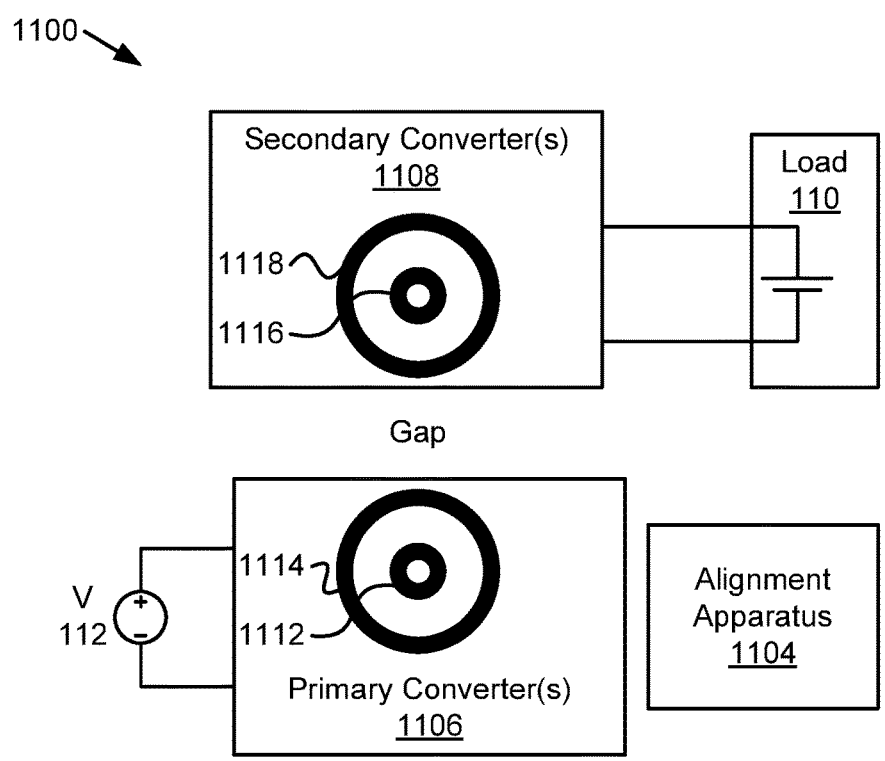
FIG. 11 is a schematic block diagram illustrating one embodiment of a system for alignment for wireless power transfer with two receiver pads in accordance with one embodiment of the present invention.

FIG. 11 is a schematic block diagram illustrating one embodiment of a WPT system 1100 for alignment for wireless power transfer with two receiver pads in accordance with one embodiment of the present invention. The WPT system 1100 includes an alignment apparatus 1104, one or more primary converters 1106, one or more secondary converters 1108, a power source 112, a load 110, a first primary transmitter pad 1112, a second primary transmitter pad 1114, a first secondary receiver pad 1116, and a second secondary receiver pad 1118, which are described below.

The power source 112 and load are substantially similar to those described above in relation to the systems 100, 101, 102 of FIGS. 1A-1C. The power source 112 feed one or more primary converters 1106 that includes a first primary transmitter pad 1112 and a second primary transmitter pad 1114. The first and second primary transmitter pads 1112, 1114 transfer power across a gap to a first secondary receiver pad 1116 and a second secondary receiver pad 1118 in one or more secondary receivers 1108. At least one of the secondary converters 1108 provides power to the load 110.

Figure 12:
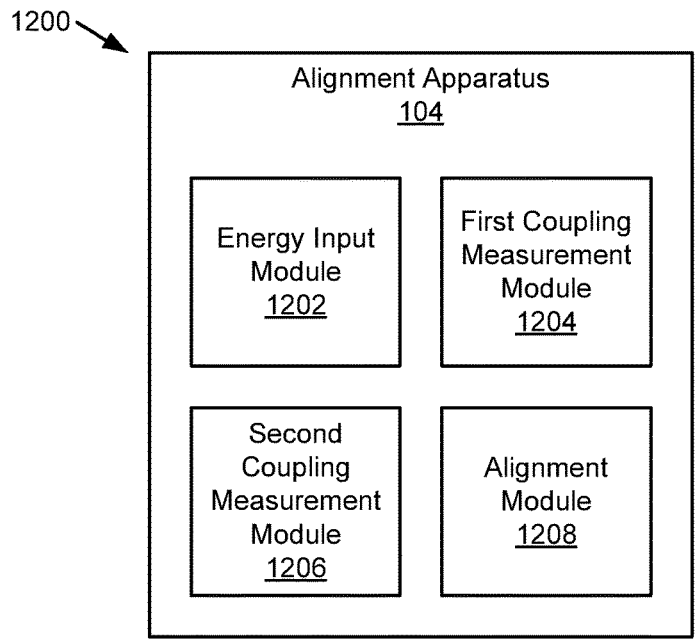
FIG. 12 is a schematic block diagram illustrating one embodiment of an apparatus for alignment for wireless power transfer with multiple receiver pads in accordance with one embodiment of the present invention.

FIG. 12 is a schematic block diagram illustrating one embodiment of an apparatus 1200 for alignment for wireless power transfer with multiple receiver pads in accordance with one embodiment of the present invention. The apparatus 1200 includes one embodiment of an alignment apparatus 104 with an energy input module 1202, a first coupling measurement module 1204, a second coupling measurement module 1206, and an alignment module 1208, which are described below.

The apparatus 1200, in one embodiment, includes an energy input module 1202 that applies an amount of energy to a first primary transmitter pad 1112 and to a second primary transmitter pad 1114 of a WPT system 1100. The first and second primary transmitter pads 1112, 1114 may be similar to the primary transmitter pads (e.g. 114, 604, 606) described above. The WPT system 1100 includes the first primary transmitter pad 1112, the second primary transmitter pad 1114, a first secondary receiver pad 1116 and a second secondary receiver pad 1118. In addition, the WPT system 1100 may include one or more primary converters, one or more secondary converters, and one or more loads. The WPT system 1100 transfers energy from the first primary transmitter pad 1112 to the first secondary receiver pad 1116 and from the second primary transmitter pad 1114 to the second secondary receiver pad 1118. The first secondary receiver pad 1116 provides power for a load and the second secondary receiver pad 1118 providing power for a load.

The one or more primary converters may be substantially similar to the primary converter 106 described above in relation to the system 100 of FIG. 1 and/or the primary inverter 608 described above in relation to the system 600 of FIG. 6. In one embodiment, the WPT system 1100 includes one primary converter that provides power to the first and second primary transmitter pads 1112, 1114. In another embodiment, the WPT system 1100 includes a first primary converter that provides power to the first primary transmitter pad 1112 and a second primary converter that provides power to the second primary transmitter pad 1114. The secondary converter, in one embodiment, is substantially similar to the secondary converter 108 in the system 100 of FIG. 1 and/or the secondary converter 614 of the system 600 of FIG. 6. In one embodiment, the WPT system 1100 includes one secondary converter connected to the first and second secondary receiver pads 1116, 1118. In another embodiment, the WPT system 1100 includes a first secondary converter connected to the first secondary receiver pad 1116 and a second secondary converter connected to the second secondary receiver pad 1118.

In one embodiment, the WPT system 1100 includes a first primary transmitter pad 1112 and a first secondary receiver pad 1116 that are within or centered within a second primary transmitter pad 1114 and a second secondary receiver pad 1118 as described above in relation to the receiver pads of FIG. 10. In another embodiment, the WPT system 1100 includes first and second primary transmitter pads 1112, 1114 and first and second secondary receiver pads 1116, 1118 oriented as described in FIGS. 9A and 9B. While the apparatus 1200 of FIG. 12 describes only first and second receiver pads, the embodiments described in relation to the apparatuses 1200 and 1300 may also include more than two primary transmitter pads and/or secondary receiver pads.

In one embodiment, the energy input module 1202 is similar to the energy input module 202 of the apparatuses 200, 300 of FIGS. 2 and 3. In another embodiment, the energy input module 1202 applies an amount of energy to the first primary transmitter pad 1112 and then to the second primary transmitter pad 1114 at a later time. In another embodiment, the energy input module 1202 applies an amount of energy simultaneously to the first and second primary transmitter pads 1112, 1114.

The apparatus 1200, in one embodiment, includes a first coupling measurement module 1204 that measures a first coupling coefficient between the first primary transmitter pad 1112 and the first secondary receiver pad 1116 when the first primary transmitter pad 1112 and the first secondary receiver pad 1116 are separated by a vertical distance and horizontally aligned at a horizontal position. The apparatus 1200, in another embodiment, includes a second coupling measurement module 1206 that measures a second coupling coefficient between the second primary transmitter pad 1114 and the second secondary receiver pad 1118 when the second primary transmitter pad 1114 and the second secondary receiver pad 1118 are separated by a vertical distance and horizontally aligned at a horizontal position. The first and second coupling measurement modules 1204, 1206 may use similar techniques for measuring coupling coefficients as described above in relation to the coupling measurement module 206 of the apparatuses 200, 300 of FIGS. 2 and 3.

In one embodiment, the apparatus 1200 includes an alignment module 1208 that determines alignment between the first and second primary transmitter pads 1112, 1114 relative to the first and second secondary receiver pads 1116, 1118 based on the first coupling coefficient and the second coupling coefficient. For example, the alignment module 1208 may compare the coupling coefficients to determine alignment where both coupling coefficients being high may signify a higher amount of alignment. For example, where the first primary transmitter pad 1112 and the first secondary receiver pad 1116 are small and the second primary transmitter pad 1114 and second secondary receiver pad 1118 are larger, a high second coupling coefficient and a low first coupling coefficient may signify that the receiver pads are not as well aligned as when the first and second coupling coefficients are high.

In one embodiment, the alignment module 1208 determines alignment by inputting the first and second coupling coefficients in an algorithm to calculate an alignment condition where an alignment condition is related to a combination of the first coupling coefficient and the second coupling coefficient. For example, an algorithm may accept the first and second coupling coefficients as input and may mathematically calculate an alignment condition. In another embodiment, the alignment module 1208 determines alignment using an alignment lookup table. The alignment lookup table includes a plurality of alignment conditions, where each alignment condition corresponds to a combination of a first coupling coefficient and a second coupling coefficient. For example, the alignment lookup table may be based on measurements of first and second coupling coefficients for various alignment conditions.

In another embodiment, the alignment module determines alignment using the alignment lookup table and interpolation between values in the alignment lookup table to determine an alignment condition. In another embodiment, the alignment module determines alignment by determining a first pad alignment condition of the first primary transmitter pad 1112 and the first secondary receiver pad 1116 and by determining a second pad alignment condition of the second primary transmitter pad 1114 and the second secondary receiver pad 1118. The first pad alignment condition and the second pad alignment condition may be used to then determine an overall alignment condition of the receiver pads. One of skill in the art will recognize other ways to determine alignment using the first and second coupling coefficients.

In one embodiment, the energy input module 1202 applies an amount of energy to the first primary transmitter pad 1112 and the first coupling measurement module 1204 measures the first coupling coefficient between the first primary transmitter pad 1112 and the first secondary receiver pad 1116 and then the alignment module 1208 determines alignment of the first primary transmitter pad 1112 and the first secondary receiver pad 1116 and the WPT system 1100 starts providing energy to a load (e.g. 110) through the second primary transmitter pad 1114 and the second secondary receiver pad 1118 in response to the alignment module 1208 determining that the first primary transmitter pad 1112 and the first secondary receiver pad 1116 are aligned to an acceptable level. In this instance, the first primary transmitter pad 1112 and the first secondary receiver pad 1116 are used for alignment while the second primary transmitter pad 1114 and the second secondary receiver pad 1118 are used to transmit power.

Figure 13:
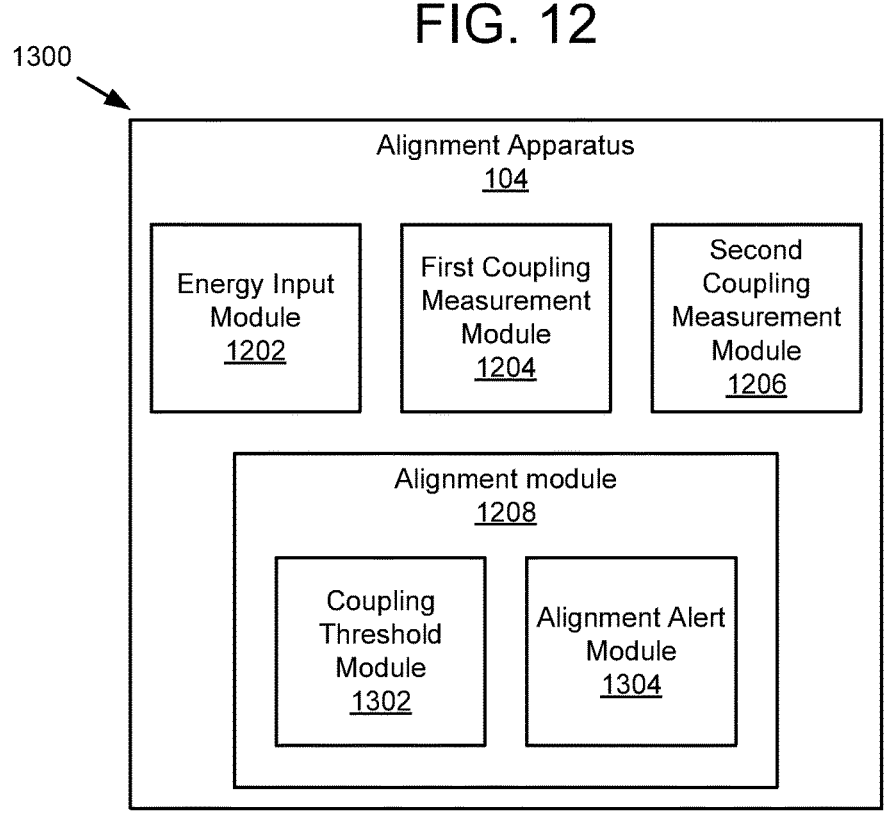
FIG. 13 is a schematic block diagram illustrating another embodiment of an apparatus for alignment for wireless power transfer with multiple receiver pads in accordance with one embodiment of the present invention.

FIG. 13 is a schematic block diagram illustrating another embodiment of an apparatus 1300 for alignment for wireless power transfer with multiple receiver pads in accordance with one embodiment of the present invention. The apparatus 1300, includes one embodiment of the alignment apparatus 104 with an energy input module 1202, a first coupling measurement module 1204, a second coupling measurement module 1206, and an alignment module 1208, which are substantially similar to those described above in relation to the apparatus 1200 of FIG. 12. The apparatus 1300 may include an alignment module with a coupling threshold module 1302 and an alignment alert module 1304, which are described below.

The apparatus 1300, in one embodiment, includes a coupling threshold module 1302 that determines if the first coupling coefficient is above a first coupling threshold and that determines if the second coupling coefficient is above a second coupling threshold and includes an alignment alert module 1304 that sends a first alignment alert in response to the first coupling coefficient being above the first coupling threshold and sends a second alignment alert in response to the second coupling coefficient being above the second coupling threshold. In one embodiment, each coupling threshold corresponds to an alignment condition. Where the alignment alert module 1304 sends out only one alert for a particular alignment, the alignment may not be sufficient for charging or power transfer. Where the alignment alert module 1304 sends out the first and second alignment alerts, alignment of receiver pads may be sufficient for charging.

In one embodiment, the coupling threshold module 1302 compares the first coupling coefficient to a plurality of first coupling thresholds and compares the second coupling coefficient to a plurality of second coupling thresholds and the alignment alert module 1304 sends a different alignment alert for each condition of the first coupling coefficient exceeding a first coupling threshold of a plurality of first thresholds and the second coupling coefficient exceeding a second coupling threshold of a plurality of second thresholds. In the embodiment, the various alignment alerts may indicate several alignment conditions.

For example, the first coupling coefficient may be compared to three first coupling thresholds corresponding to three levels of alignment, such as near, close, and aligned. The second coupling coefficient may also be compared to three second coupling thresholds. Having multiple coupling thresholds may provide more information about alignment than having a single first coupling threshold and a single second coupling threshold. In another embodiment, the first and second coupling coefficients are related to a continuous scale of alignment for each coupling coefficient and the alignment condition corresponding to a coupling coefficient may be displayed or transmitted. One of skill in the art will recognize other ways for the alignment module to use two coupling coefficients to determine alignment.

Figure 14:
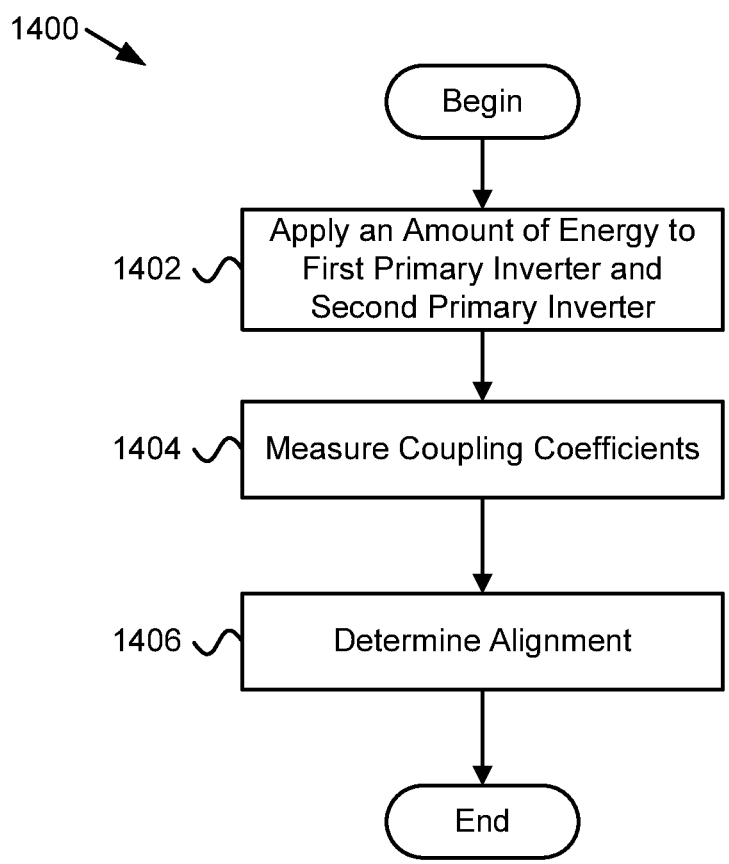
FIG. 14 is a flow chart diagram illustrating one embodiment of a method for alignment for wireless power transfer with multiple pads in accordance with one embodiment of the present invention.

FIG. 14 is a flow chart diagram illustrating one embodiment of a method 1400 for alignment for wireless power transfer with multiple pads in accordance with one embodiment of the present invention. The method 1400 begins and applies 1402 an amount of energy to a first primary transmitter pad 1112 and a second primary transmitter pad 1114 of a WPT system 1100. The WPT system 1100 includes the first primary transmitter pad 1112, the second primary transmitter pad 1114, a first secondary receiver pad 1116 and a second secondary receiver pad 1118 and the WPT system 1100 transfers energy from the first primary transmitter pad 1112 to the first secondary receiver pad 1116 and from the second primary transmitter pad 1114 to the second secondary receiver pad 1118. The first secondary receiver pad 1116 provides power for a load and the second secondary receiver pad 1118 provides power for a load. In one embodiment, the energy input module 1202 applies energy to the first and second primary transmitter pads 1112, 1114.

The method 1400 measures 1404 a first coupling coefficient between the first primary transmitter pad 1112 and the first secondary receiver pad 1116 when the first primary transmitter pad 1112 and the first secondary receiver pad are separated by a vertical distance and horizontally aligned at a horizontal position and measures 1404 measuring a second coupling coefficient between the second primary transmitter pad 1114 and the second secondary receiver pad 1118 when the second primary transmitter pad 1114 and the second secondary receiver pad 1118 are separated by a vertical distance and horizontally aligned at a horizontal position. The first coupling measurement module 1204 may measure the first coupling coefficient and the second coupling measurement module 1206 may measure the second coupling coefficient. The method 1400 determines 1406 alignment between the first and second primary transmitter pads 1112, 1114 relative to the first and second secondary receiver pads 1116, 1118 based on the first coupling coefficient and the second coupling coefficient, and the method 1400 ends. The method 1400 may use an algorithm, thresholds, a lookup table or any of the methods described above or any other method known to those of skill in the art to determine 1406 alignment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an energy input module that applies an amount of energy to a primary converter of a wireless power transfer ("WPT") system, the WPT system comprising the primary converter with a primary transmitter pad and a secondary converter with a secondary receiver pad, the WPT system transferring energy from the primary transmitter pad of the primary converter to the secondary receiver pad of the secondary converter, the secondary converter providing power to a load;
a coupling measurement module that measures a coupling coefficient between the primary transmitter pad and the secondary receiver pad when the primary transmitter pad and the secondary receiver pad are separated by a vertical distance and horizontally aligned at a horizontal position;
a coupling threshold module that determines if the coupling coefficient is above a coupling threshold, the coupling threshold indicative of a condition acceptable for transferring power to the load; and
an alignment alert module that sends an alignment alert in response to the coupling coefficient being above the coupling threshold,
wherein the energy input module applies the amount of energy to the primary converter under one of:
a no load condition between the secondary converter and the load, wherein the WPT system provides substantially no power to the load during the no load condition; and
during a measurement operation, wherein the WPT system limits power transfer to a low power to the load during the measurement operation,
wherein a switching frequency of the primary converter during the measurement operation and the no load condition is controlled to a particular frequency.

2. The apparatus of claim 1, wherein the energy input module further comprises an energy increase module that applies the amount of energy to the primary converter by increasing an amount of energy applied to the primary converter over a specified amount of time.

3. The apparatus of claim 2, wherein the energy increase module increases an input voltage of the primary converter through an input voltage range.

4. The apparatus of claim 2, wherein the primary converter comprises an inverter and comprises an H-bridge and the H-bridge is controlled using a phase angle duty cycle control technique and wherein the energy increase module increases a conduction angle through a conduction angle range.

5. The apparatus of claim 4, wherein the phase angle duty cycle control comprises one of symmetric voltage-cancellation ("SVC") control, asymmetric voltage-cancellation ("AVC") control, and asymmetric duty cycle ("ADC") control.

6. The apparatus of claim 1, wherein the energy input module applies the amount of energy to the primary converter during at least a quality factor number of switching cycles of a switching period of the primary converter, the quality factor comprising a number of switching cycles for the WPT system to reach a steady state condition after a transient condition.

7. The apparatus of claim 6, wherein the primary converter operates with a switching frequency of about 23.4 kilohertz and the energy input module applies the amount of energy to the primary converter over about 1 millisecond.

8. The apparatus of claim 6, wherein the energy input module applies the amount of energy to the primary converter over a range of about 100 milliseconds to 1 second.

9. The apparatus of claim 8, wherein the coupling coefficient is proportional to a ratio of output direct current ("DC") voltage to transmitter pad current.

10. The apparatus of claim 1, further comprising a voltage reset module that resets a voltage on an output capacitor of the secondary converter to an initial voltage one or more of:
before the energy input module applies the amount of energy to the primary converter; and
after the energy input module applies the amount of energy to the primary converter.

11. The apparatus of claim 10, wherein the energy input module applies the amount of energy to the primary converter a plurality of times and the voltage reset module resets the output capacitor voltage after each time that the energy input module applies the amount of energy to the primary converter, wherein the coupling measurement module determines an average coupling coefficient based on the measurements associated with each time that the amount of energy is applied to the primary converter.

12. The apparatus of claim 1, wherein the energy input module further comprises a static input module that applies the amount of energy to the primary converter using a fixed rate of energy input.

13. The apparatus of claim 12, wherein the static input module applies energy to the primary converter for a specified amount of time.

14. The apparatus of claim 1, wherein the coupling measurement module measures bridge current and output voltage and determines a coupling coefficient based on one or more of the measured bridge current and output voltage, the output voltage comprising an output voltage of the secondary converter.

15. The apparatus of claim 14, wherein the coupling measurement module further comprises a coupling lookup module that determines a coupling coefficient from a coupling coefficient table, the coupling coefficient table comprising a plurality of coupling coefficients, each coupling coefficient in the coupling coefficient table comprising one or more of a corresponding output voltage and a corresponding bridge current.

16. The apparatus of claim 14, wherein the coupling measurement module further comprises a coupling calculation module that determines a coupling coefficient using a coupling coefficient formula where one or more of the output voltage and bridge current are variables and coupling coefficient is an output of the coupling coefficient formula.

17. The apparatus of claim 16, wherein the primary converter and secondary converter comprise an LCL resonant converter system and the coupling coefficient formula comprises:

$$i_b = \frac{L_b L_m M R_2 V_1 s^2}{C_1 \beta \left(V_1 - \frac{L_m V_1 \sigma_3}{C_1 n^2 \left(L_b s + \frac{L_m \sigma_3}{C_1 n^2 \sigma_1 \sigma_2}\right) \sigma_1 \sigma_2}\right) \sigma_1 \left(R_2 + L_2 s + \frac{1}{C_2 s}\right) \sigma_2}$$

where:

$$\beta = L_b s + \frac{L_m \sigma_3}{C_1 n^2 \sigma_1 \sigma_2}$$

-continued $$\sigma_1 = L_m s + \frac{\sigma_3}{C_1 n^2 s \sigma_2}$$

$$\sigma_2 = L_1 s + \frac{1}{C_1 s} + \frac{1}{C_{1s} s} - \frac{M^2 s^2}{R_2 + L_2 s + \frac{1}{C_2 s}}$$

$$\sigma_3 = L_1 s + \frac{1}{C_{1s} s} - \frac{M^2 s^2}{R_2 + L_2 s + \frac{1}{C_2 s}}$$

$$k = \frac{M}{\sqrt{L_1 \cdot L_2}}$$

and:
k coupling coefficient;
M Mutual inductance between primary transmitter pad and the secondary receiver pad;
$L_1$ Self-inductance of the primary transmitter pad;
$L_2$ Self-inductance of the secondary receiver pad;
$i_b$ Inductor current of inductor $L_b$;
$L_m$ Transformer magnetizing inductance;
$C_2$ Parallel tuning capacitor on a secondary resonant circuit of the secondary converter;
$C_{1s}$ Series tuning capacitor on a primary LCL load resonant converter of the primary converter;
$C_1$ Parallel tuning capacitor on the primary LCL load resonant converter;
$L_b$ Bridge inductance of LCL load resonant converter;
$R_2$ Initial output voltage divided by output current;
$V_1$ DC input voltage to the primary LCL load resonant converter;
s i·ω where i is an imaginary number
ω co Angular operating frequency of primary converter in radians where ω=2πf;
f Operating frequency of the primary converter in hertz; and
n Turns ratio of a transformer in the primary converter.

18. The apparatus of claim 1, further comprising a misalignment alert module that sends a misalignment alert in response to the coupling coefficient being below the coupling threshold.

19. The apparatus of claim 1, wherein the primary converter comprises an LCL load resonant converter, the LCL load resonant converter comprising an H-bridge, an LCL network, and a primary transmitter pad and the secondary converter comprises an LCL network and a rectification section, the rectification section comprising an output capacitor, the rectification section connected to a load.

20. The apparatus of claim 1, wherein the coupling threshold comprises a minimum coupling threshold and further comprising:
a maximum threshold module that determines if the coupling coefficient is above a maximum coupling threshold; and
a maximum signal module that sends a maximum threshold alert in response to the maximum threshold module determining that the coupling coefficient is above the maximum coupling threshold.

21. The apparatus of claim 1, wherein the secondary converter transfers energy to the load in response to receiving the alignment alert from the alignment alert module.

22. The apparatus of claim 1, wherein the primary converter and the secondary converter are bidirectional and the energy input module applies an amount of energy to the secondary converter and the secondary converter transfers energy from the secondary receiver pad to the primary transmitter pad of the primary converter and the primary converter provides power to a load during a measurement operation and the primary converter transfers energy from the primary transmitter pad to the secondary receiver pad of the secondary converter and the secondary converter provides power to the load during a load power operation.

23. The apparatus of claim 1, further comprising:
a shutdown threshold module that determines if the coupling coefficient is below a coupling shutdown threshold; and
a charging shutdown module that stops the primary converter from providing power in response to the coupling coefficient being below the coupling shutdown threshold.

24. A wireless power transfer ("WPT") system comprising:
a primary converter comprising a primary transmitter pad;
a secondary converter comprising a secondary receiver pad;
a load coupled to the secondary receiver, wherein the primary converter transmits energy wirelessly from the primary transmitter pad to the secondary receiver pad and the secondary converter sends the received energy to the load;
an energy input module that applies an amount of energy to the primary converter;
a coupling measurement module that measures a coupling coefficient between the primary transmitter pad and the secondary receiver pad when the primary transmitter pad and the secondary receiver pad are separated by a vertical distance and horizontally aligned at a horizontal position;
a coupling threshold module that determines if the coupling coefficient is above a coupling threshold, the coupling threshold indicative of a condition acceptable for transferring power to the load; and
an alignment alert module that sends an alignment alert in response to the coupling coefficient being above the coupling threshold,
wherein the energy input module applies the amount of energy to the primary converter under one of:
a no load condition between the secondary converter and the load, wherein the WPT system provides substantially no power to the load during the no load condition; and
during a measurement operation, wherein the WPT system limits power transfer to a low power to the load during the measurement operation,
wherein a switching frequency of the primary converter during the measurement operation and the no load condition is controlled to a particular frequency.

25. The WPT system of claim 24, wherein the primary converter is stationary and the secondary converter is on a vehicle, the secondary receiver pad located to align with the stationary primary transmitter pad.

26. A method for alignment, the method comprising:
applying an amount of energy to a primary converter of a wireless power transfer ("WPT") system, the WPT system comprising the primary converter with a primary transmitter pad and a secondary converter with a secondary receiver pad, the WPT system transferring energy from the primary transmitter pad of the primary converter to the secondary receiver pad of the secondary converter, the secondary converter providing power to a load;

measuring a coupling coefficient between the primary transmitter pad and the secondary receiver pad when the primary transmitter pad and the secondary receiver pad are separated by a vertical distance and horizontally aligned at a horizontal position;

determining if the coupling coefficient is above a coupling threshold, the coupling threshold indicative of a condition acceptable for transferring power to the load; and sending an alignment alert in response to the coupling coefficient being above the coupling threshold, wherein applying the amount of energy to the primary converter comprises applying an amount of energy under one of:

a no load condition between the secondary converter and the load, wherein the WPT system provides substantially no power to the load during the no load condition; and during a measurement operation, wherein the WPT system limits power transfer to a low power to the load during the measurement operation, wherein a switching frequency of the primary converter during the measurement operation and the no load condition is controlled to a particular frequency.

27. An apparatus comprising:

a coupling measurement module that measures, for each set of receiver pads, a coupling coefficient, a set of receiver pads comprising a primary transmitter pad mounted in a fixed location and a secondary receiver pad mounted on a movable object, wherein the primary transmitter pad of a set of receiver pads transmits power wirelessly to the secondary receiver pad of the set of receiver pads, the movable object comprising two or more secondary receiver pads, each corresponding to a primary transmitter pad mounted in a fixed location;

a coupling comparison module that compares, for each set of receiver pads, the measured coupling coefficient with one or more pre-determined coupling coefficients to determine an alignment of each set of receiver pads, the predetermined coupling coefficients corresponding to various alignment conditions of a set of receiver pads; and an alignment module that determines an alignment of the movable object based on the determined alignments of the sets of receiver pads.

28. The apparatus of claim 27, wherein the two or more secondary receiver pads and corresponding primary transmitter pads comprise a first set of receiver pads and a second set of receiver pads and a first set of primary transmitter and secondary receiver pads and a second set of primary transmitter and secondary receiver pads are aligned one of in line with a direction of travel of the movable object; and perpendicular to a direction of travel of the movable object.

29. The apparatus of claim 27, wherein the two or more secondary receiver pads and corresponding primary transmitter pads comprise three or more sets of primary transmitter and secondary receiver pads and wherein the sets of primary transmitter and secondary receiver pads are mounted in a pattern to provide alignment information in a direction of travel of the movable object and perpendicular to the direction of travel of the movable object.

30. The apparatus of claim 29, wherein the three or more sets of primary transmitter and secondary receiver pads comprise four or more sets of primary transmitter and secondary receiver pads and the secondary receiver pads and corresponding primary transmitter pads are arranged in one of:

a square pattern relative to the direction of travel of the movable object;

a rectangular pattern relative to the direction of travel of the movable object;

a diamond pattern relative to the direction of travel of the movable object; and a pattern with a secondary receiver pad near a front of the movable object, a secondary receiver pad near a rear of the movable object, and a pair of secondary receiver pads arranged next to each other on a line perpendicular to the direction of travel of the moveable object and between the front and rear secondary receiver pads.

31. The apparatus of claim 27, wherein one or more of the sets of receiver pads are part of a wireless power transfer ("WPT") system that wirelessly transfers energy from one or more of the primary transmitter pads to corresponding secondary receiver pads.

32. The apparatus of claim 31, wherein the WPT system transfers power to a load of the movable object through one or more of the sets of receiver pads.

33. The apparatus of claim 27, further comprising an alignment communication module that communicates alignment of the movable object to one or more of:

a user;

a computer system; and a driver when the movable object comprises a vehicle.

34. The apparatus of claim 33, wherein the alignment communication module communicates alignment of the movable object by one or more of:

a graphical representation of the movable object and an amount of alignment or misalignment;

an amount of alignment or misalignment of each set of receiver pads;

text indicating alignment or misalignment;

an audio signal indicating alignment or misalignment; and a direction of misalignment.

35. The apparatus of claim 27, wherein each primary transmitter pad and corresponding secondary receiver pad are paired using a unique identifier wherein the coupling measurement module measures a coupling coefficient of a set of receiver pads without measuring a coupling coefficient of a primary transmitter pad of a first set and a secondary receiver pad of a second set.

36. The apparatus of claim 27, wherein a set of receiver pads comprises two or more secondary receiver pads paired with a single primary transmitter pad and wherein the alignment module determines a direction of misalignment based on the coupling measurement module measuring a coupling coefficient for each secondary receiver pad and the primary transmitter pad and the coupling comparison module comparing each measured coupling coefficient with a predetermined coupling coefficient.

37. A method comprising:

measuring, for each set of receiver pads, a coupling coefficient, a set of receiver pads comprising a primary transmitter pad mounted in a fixed location and a secondary receiver pad mounted on a movable object, wherein the primary transmitter pad of a set of receiver pads transmits power wirelessly to the secondary receiver pad of the set of receiver pads, the movable object comprising two or more secondary receiver pads, each corresponding to a primary transmitter pad mounted in a fixed location;

comparing, for each set of receiver pads, the measured coupling coefficient with one or more pre-determined coupling coefficients to determine an alignment of each set of receiver pads, the predetermined coupling coefficients corresponding to various alignment conditions of a set of receiver pads; and determining an alignment of the movable object based on the determined alignments of the sets of receiver pads.

38. An apparatus comprising:

an energy input module that applies an amount of energy to a first primary transmitter pad and to a second primary transmitter pad of a wireless power transfer ("WPT") system, the WPT system comprising the first primary transmitter pad, the second primary transmitter pad, a first secondary receiver pad and a second secondary receiver pad, the WPT system transferring energy from the first primary transmitter pad to the first secondary receiver pad and from the second primary transmitter pad to the second secondary receiver pad, the first secondary receiver pad providing power for a load and the second secondary receiver pad providing power for a load;

a first coupling measurement module that measures a first coupling coefficient between the first primary transmitter pad and the first secondary receiver pad when the first primary transmitter pad and the first secondary receiver pad are separated by a vertical distance and horizontally aligned at a horizontal position;

a second coupling measurement module that measures a second coupling coefficient between the second primary transmitter pad and the second secondary receiver pad when the second primary transmitter pad and the second secondary receiver pad are separated by a vertical distance and horizontally aligned at a horizontal position;

an alignment module that determines alignment between the first and second primary transmitter pads relative to the first and second secondary receiver pads based on the first coupling coefficient and the second coupling coefficient.

39. The apparatus of claim 38, wherein the second primary transmitter pad is shaped with coils around an interior section and wherein the first primary transmitter pad is positioned within the interior section of the second primary transmitter pad and wherein the second secondary receiver pad is shaped with coils around an interior section and wherein the first secondary receiver pad is positioned within the interior section of the second secondary receiver pad.

40. The apparatus of claim 39, wherein the first primary transmitter pad is at a center of the interior section of the second secondary receiver pad and the first secondary receiver pad is at a center of the interior section of the second secondary receiver pad.

41. The apparatus of claim 39, wherein the first primary transmitter pad and the first secondary receiver pad are sized to transmit an energy level consistent with an alignment operation and the second primary transmitter pad and the second secondary receiver pad are sized to transmit an energy level consistent with an alignment operation and a charging operation.

42. The apparatus of claim 38, wherein the alignment module determines alignment by inputting the first and second coupling coefficients in an algorithm to calculate an alignment condition wherein an alignment condition is related to a combination of the first coupling coefficient and the second coupling coefficient.

43. The apparatus of claim 38, wherein the alignment module determines alignment using an alignment lookup table, the alignment lookup table comprising a plurality of alignment conditions, wherein each alignment condition corresponds to a combination of a first coupling coefficient and a second coupling coefficient.

44. The apparatus of claim 43, wherein the alignment module determines alignment using the alignment lookup table and interpolation between values in the alignment lookup table to determine an alignment condition.

45. The apparatus of claim 43, wherein the alignment module determines alignment by determining a first pad alignment condition of the first primary transmitter pad and the first secondary receiver pad and by determining a second pad alignment condition of the second primary transmitter pad and the second secondary receiver pad.

46. The apparatus of claim 45, wherein the alignment module further comprises a coupling threshold module that determines if the first coupling coefficient is above a first coupling threshold and that determines if the second coupling coefficient is above a second coupling threshold; and an alignment alert module that sends a first alignment alert in response to the first coupling coefficient being above the first coupling threshold and sends a second alignment alert in response to the second coupling coefficient being above the second coupling threshold.

47. The apparatus of claim 46, wherein the coupling threshold module compares the first coupling coefficient to a plurality of first coupling thresholds and compares the second coupling coefficient to a plurality of second coupling thresholds and wherein the alignment alert module sends a different alignment alert for each condition of the first coupling coefficient exceeding a first coupling threshold of a plurality of first thresholds and the second coupling coefficient exceeding a second coupling threshold of a plurality of second thresholds.

48. The apparatus of claim 38, wherein the WPT system further comprises:

a primary inverter that that receives input power and converts the input power to a waveform comprising an alternating current ("AC") waveform and selectively transfers power to the first primary transmitter pad and the second primary transmitter pad; and a secondary converter that receives power from one or more of the first secondary receiver pad and the second secondary receiver pad and converts power to a form usable for providing power to a load.

49. The apparatus of claim 38, wherein the WPT system further comprises:

a first primary inverter that that receives input power and converts the input power to a waveform comprising an alternating current ("AC") waveform and transfers power to the first primary transmitter pad;

a first secondary converter that receives power from the first secondary receiver pad and converts power from the first secondary receiver pad to a form usable for providing power to a load;

a second primary inverter that that receives input power and converts the input power to a waveform comprising an AC waveform and transfers power to the second primary transmitter pad; and a second secondary converter that receives power from the second secondary receiver pad and converts power from the second secondary receiver pad to a form usable for providing power to a load.

50. A method comprising:
applying an amount of energy to a first primary transmitter pad and a second primary transmitter pad of a wireless power transfer ("WPT") system, the WPT system comprising the first primary transmitter pad, the second primary transmitter pad, a first secondary receiver pad and a second secondary receiver pad, the WPT system transferring energy from the first primary transmitter pad to the first secondary receiver pad and from the second primary transmitter pad to the second secondary receiver pad, the first secondary receiver pad providing power for a load and the second secondary receiver pad providing power for a load;
measuring a first coupling coefficient between the first primary transmitter pad and the first secondary receiver pad when the first primary transmitter pad and the first secondary receiver pad are separated by a vertical distance and horizontally aligned at a horizontal position;
measuring a second coupling coefficient between the second primary transmitter pad and the second secondary receiver pad when the second primary transmitter pad and the second secondary receiver pad are separated by a vertical distance and horizontally aligned at a horizontal position;
determining alignment between the first and second primary transmitter pads relative to the first and second secondary receiver pads based on the first coupling coefficient and the second coupling coefficient.

51. The method of claim 50, wherein determining alignment comprises inputting the first and second coupling coefficients in an algorithm to calculate an alignment condition wherein an alignment condition is related to a combination of the first coupling coefficient and the second coupling coefficient.

52. The method of claim 50, wherein determining alignment comprises using an alignment lookup table, the alignment lookup table comprising a plurality of alignment conditions, wherein each alignment condition corresponds to a combination of a first coupling coefficient and a second coupling coefficient.

53. The method of claim 50, wherein determining alignment comprises determining a first pad alignment condition of the first primary transmitter pad and the first secondary receiver pad and by determining a second pad alignment condition of the second primary transmitter pad and the second secondary receiver pad.

54. The method of claim 53, wherein determining alignment comprises:
determining if the first coupling coefficient is above a first coupling threshold and determining if the second coupling coefficient is above a second coupling threshold; and
sending a first alignment alert in response to the first coupling coefficient being above the first coupling threshold and sending a second alignment alert in response to the second coupling coefficient being above the second coupling threshold.

55. A wireless power transfer ("WPT") system comprising:
a first primary transmitter pad;
a first secondary receiver pad;
a second primary transmitter pad;
a second secondary receiver pad, wherein the WPT system transfers energy from the first primary transmitter pad to the first secondary receiver pad and from the second primary transmitter pad to the second secondary receiver pad;
a load coupled to the secondary receiver pad, wherein energy from the second secondary receiver pad provides power to the load;
an energy input module that applies an amount of energy to the first primary transmitter pad and to the second primary transmitter pad;
a first coupling measurement module that measures a first coupling coefficient between the first primary transmitter pad and the first secondary receiver pad when the first primary transmitter pad and the first secondary receiver pad are separated by a vertical distance and horizontally aligned at a horizontal position;
a second coupling measurement module that measures a second coupling coefficient between the second primary transmitter pad and the second secondary receiver pad when the second primary transmitter pad and the second secondary receiver pad are separated by a vertical distance and horizontally aligned at a horizontal position; and
an alignment module that determines alignment between the first and second primary transmitter pads relative to the first and second secondary receiver pads based on the first coupling coefficient and the second coupling coefficient.

56. The system of claim 55, further comprising a vehicle, wherein the first secondary receiver pad and the second secondary receiver pad are mounted to the vehicle and the load comprises one or more of a battery that provides power to the vehicle and a drive system that moves the vehicle.

57. The system of claim 55, further comprising one or more of:
a first primary inverter that that receives input power from the input module and converts the input power to a waveform comprising an alternating current ("AC") waveform and selectively transfers power to one or more of the first primary transmitter pad and the second primary transmitter pad;
a first secondary converter that receives power from one or more of the first secondary receiver pad and the second secondary receiver pad and converts power to a form usable for providing power to a load;
a second primary inverter that that receives input power and converts the input power to a waveform comprising an AC waveform and transfers power to the second primary transmitter pad;
a second secondary converter that receives power from the second secondary receiver pad and converts power from the second secondary receiver pad to a form usable for providing power to the load;
a battery that receives power from one or more of the first secondary converter and the second secondary converter, the battery comprising at least a portion of the load; and
a motor that receives power from one or more of the first secondary converter and the second secondary converter, the motor comprising at least a portion of the load.

* * * * *